United States Patent [19]
Hughes

[11] Patent Number: 5,982,893
[45] Date of Patent: Nov. 9, 1999

[54] SYSTEM AND METHOD FOR PROCESSING TRANSACTION MESSAGES

[75] Inventor: Eric G. Hughes, Berkeley, Calif.

[73] Assignee: Simple Access Partners, LLC., San Francisco, Calif.

[21] Appl. No.: 09/090,796

[22] Filed: Jun. 4, 1998

Related U.S. Application Data

[60] Provisional application No. 60/048,568, Jun. 4, 1997.

[51] Int. Cl.$^6$ ........................................................ H01L 9/00
[52] U.S. Cl. .................................................. 380/4; 380/23
[58] Field of Search ..................... 380/4, 23; 395/182.04

[56] References Cited

U.S. PATENT DOCUMENTS

| | | | |
|---|---|---|---|
| 5,337,360 | 8/1994 | Fischer | 380/23 |
| 5,638,443 | 6/1997 | Stefik et al. | 380/4 |
| 5,757,913 | 5/1998 | Bellare et al. | 380/23 |
| 5,787,175 | 7/1998 | Carter | 380/25 |
| 5,883,956 | 3/1996 | Le et al. | 380/4 |

*Primary Examiner*—Tod R. Swann
*Assistant Examiner*—Todd Jack
*Attorney, Agent, or Firm*—Ritter, VanPelt & Yi LLP

[57] ABSTRACT

A method of processing a transaction message is disclosed. The method includes receiving an incoming raw transport message. The raw transport message is stored in a channel interface database. A raw message identifier is generated. The raw message identifier is determined such that the raw message identifier verifiably identifies the raw message. A communications context identifier is generated. The communications context identifier is determined such that the communications context identifier verifiably identifies the raw message and the channel. The raw message is converted into a transaction message and the transaction message is validated.

19 Claims, 22 Drawing Sheets

| COMMUNICATIONS CONTEXT DATABASE |
| --- |
| TRANSPORT MESSAGE |
| CHANNEL IDENTIFIER |
| TIME STAMP |
| CHANNEL SPECIFIC INFORMATION |
| RAW MESSAGE |
| RAW MESSAGE CNS ID |
| CONTEXT CNS ID |
| OFFSET OF MESSAGES |
| NUMBER OF MESSAGES |
| SPLITTING DATA |
| CANDIDATE MESSAGE ID |
| SUBSTRING INDICES |
| CANDIDATE MESSAGE CHECK FLAG |
| ERROR MESSAGE GENERATED FLAG |

Figure 5A

| TRANSACTION CONTEXT DATABASE |
| --- |
| TRANSACTION MESSAGE ID |
| COMMUNICATION CONTEXT ID |
| MESSAGE REPLY FLAG |
| LIST OF MESSAGE ID'S GENERATED IN RESPONSE TO TRANSACTION MESSAGE |
| MESSAGE PROCESSING COMPLETE |
| TEMPLATE IDENTIFIER |
| FIRST MESSAGE FLAG |
| PROTOCOL ID |
| CONTRACT ID |
| FIRST MESSAGE |
| PREVIOUS MESSAGE |
| RECEIVER ID |
| SENDER ID |
| EXPIRATION TIME |
| TRANSACTION MESSAGE CREATION TIME (IDEMPOTENCE CHECKED) |

Figure 5C

SYSTEM AND METHOD FOR PROCESSING TRANSACTION MESSAGES

CROSS REFERENCE TO RELATED APPLICATIONS

This application is related to co-pending Application Ser. No. 08/869,238 filed Jun. 4, 1997, which is incorporated herein by reference for all purposes. This application claims priority to U.S. Provisional Application Ser. No. 60/048,568 filed Jun. 4, 1997, which is incorporated herein by reference for all purposes.

BACKGROUND OF THE INVENTION

1. Field of the Invention

The present invention relates generally to methods and apparatuses for providing a transaction processing system for handling encapsulated transaction messages. More specifically, the invention relates to data structures for encapsulated messages and to systems and methods for processing raw messages into transaction messages that are established to be valid.

2. Description of the Related Art

The conduct of business transactions over computer networks has become an increasingly important part of the U.S. economy over the last several years. In many cases, private networks have been developed to carry transaction messages and message protocols such as Electronic Data Interchange ("EDI") have been developed to specify the form and content of messages.

Internationally, trade documents represent the essential business relationships for import and export. Trade documents include letters of credit, standby letters of credit, bills of lading, certificates of insurance, bankers acceptances, invoices, sight drafts, time drafts, trust receipts, and others. The parties whose relationships these documents represent include the buyer, the seller, banks, shippers, warehouses, and insurers. Trade documents, at base, are paper documents; international trade requires that these papers travel across borders and oceans to consummate a transaction. The use of paper to represent the business relationships between the various parties has always had certain problems and some of these problems yet persist in modem business practice.

Most international trade documents are still on paper and still travel physically. International express package delivery has greatly increased the speed and reliability of this paper movement, but the papers still require large amounts of handling once they arrive, with all the attendant problems of paperwork. The problems with paper are well known. Paper requires human handling, which is more expensive than computer automation. Trade documents are still sometimes generated in multiple, numbered originals to guard against loss. Paper is unsuitable for the speed of modern commerce.

EDI is the state of the art insofar as the elimination of paper in these transaction environments. EDI specifically refers to the standards for data exchange as embodied in the U.S. and by ANSI ASC x12 and worldwide by UN EDI-FACT. These two standards differ only in detail. EDI, though, has a number of problems itself which have prevented its widespread adoption.

One of the major problems with using, EDI for trade documents is that the process of setting up EDI linkages is burdensome and laborious. The process of "bringing up another trading partner" involves negotiation over exact terms of the interaction. EDI messages only carry the data about particular transactions, and they do not include information about the exact terms of the agreement between the parties sending and receiving messages. EDI standards do not encapsulate information about how the message should be interpreted, how the message is expected to be handled, or the legal relationship between the parties. The lack of message interpretation information associated with the message makes it necessary for two parties that wish to deal with each other unambiguously to engage in the long process if integrating their systems together, and to make sure that the systems remain compatible as they evolve.

Compliance with EDI message format standards does not guarantee that two systems, both compliant to the same standard, will be able to understand each other's messages. The permitted variation in message formats is large enough to allow mutually incomprehensible messages. These messages may appear on the surface to be mutually comprehensible because they are both written according, to the same standard. EDI, however, has no way of distinguishing one variation of a general type of message from another. What is needed is a way of allowing variation and preserving interoperability.

Complex problems arise when different parties attempt to join their private transaction systems. In certain cases, in may be desirable to link systems across a private intranet or internet. Increasingly, it is desired to link systems across the global Internet. Complex specifications are required in order for parties to make their systems compatible. For example, a payment system may require a certain type of message to be coded in a given format, or in alternative formats. Such a payment system may also specify the type of responses that are expected, allowed or required for certain messages. A second system would need to identify the format that is used to the first system when a message is sent to the first system and would also need to specify the expected, allowed and required responses and how those responses would be determined.

Errors or misunderstandings can a rise when a format is misnamed by one system or a sequence of responses is referred to by an incorrect name or by an ambiguous name between such systems. To complicate matters further, names of formats may also change and different versions could be created.

In view of the foregoing, it would be useful if formats and expected sequences could be named in a manner that could prevent systems from having such misunderstandings. When messages are referred to, it would further be useful if two separate systems could unambiguously know that a message or data file being referred to by one system exactly matches a message stored at the other system. Such a system of reference would be especially useful for confirming or acknowledging messages. It would further be useful if duplicate messages sent as a result of the transmission media or method could be positively identified as duplicates and extra messages discarded. It would also be useful if identifiers that identify files that describe how to interpret the message body could be associated with the message body and encapsulated with the message ID and if other message information items such as the recipient and sender authentication information could also be associated with the message body.

SUMMARY OF THE INVENTION

Accordingly, the present invention provides a transaction processing system that includes an encapsulated message format that includes a verifiable data generated transaction message identifier and message interpretation identifiers that verifiably identify message interpretation files used to interpret the message. When the receiver of the message finds a message interpretation file that hashes to a specified message interpretation file identifier, the receiver can be certain that the found message interpretation file is identical to the message interpretation file specified by the sender of the message. Likewise, both parties can confirm that the message identifier belongs with an encapsulated message. As a result, system incompatibilities are quickly detected and messages can be reliably referenced or identified.

A method of processing a transaction message is disclosed. The method includes receiving an incoming raw transport message. The raw transport message is stored in a channel interface database. A raw message identifier is generated. The raw message identifier is determined such that the raw message identifier verifiably identifies the raw message. A communications context identifier is generated. The communications context identifier is determined such that the communications context identifier verifiably identifies the raw message and the channel. The raw message is converted into a transaction message and the transaction message is validated.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 5A is a data structure diagram illustrating data stored in the communications context database.

FIG. 5C is a data structure diagram of the transaction context database.

DETAILED DESCRIPTION OF THE DRAWINGS

Reference will now be made in detail to a preferred embodiment of the invention. An example of a preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

ENCAPSULATED MESSAGES

Figure 1:
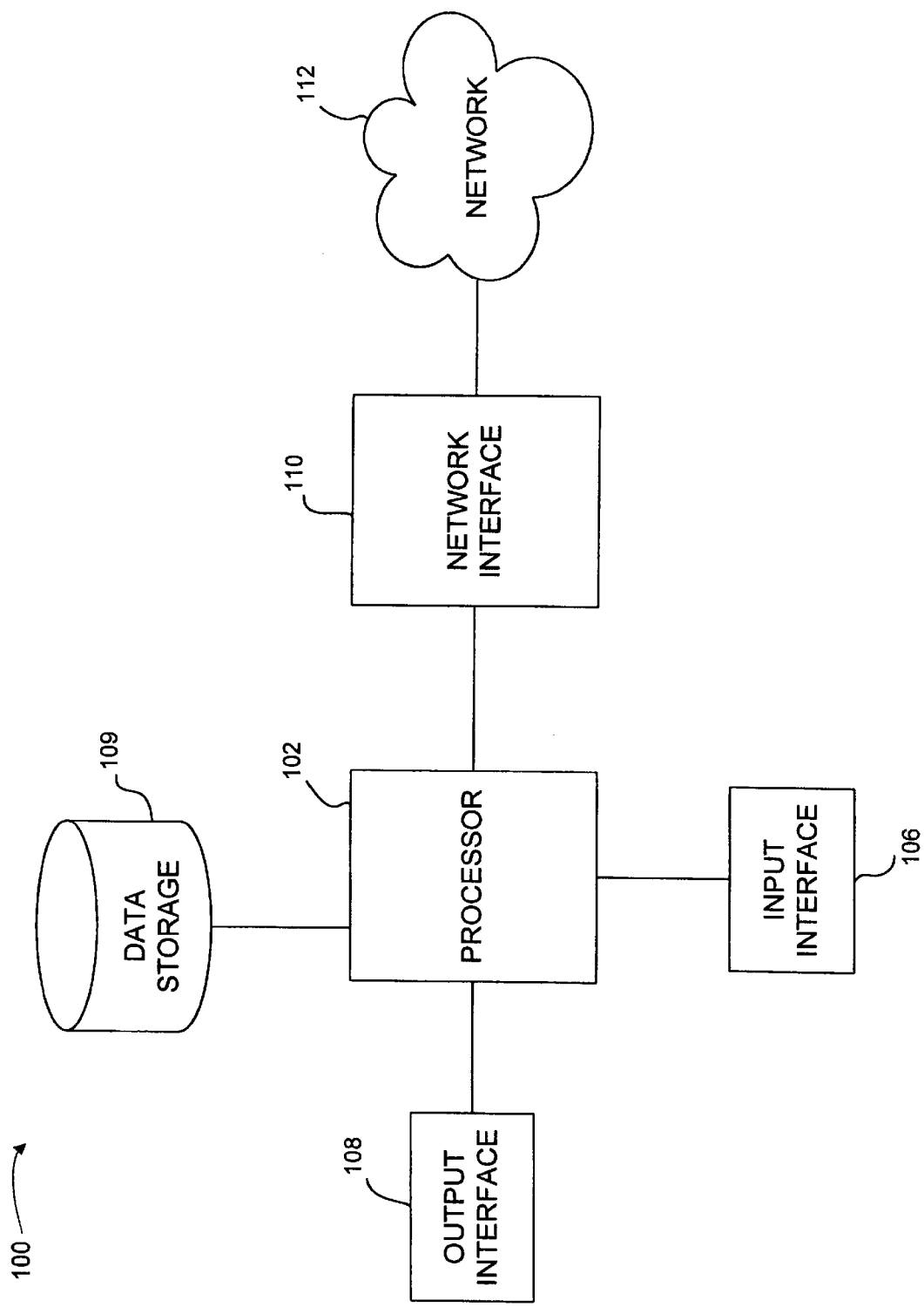
FIG. 1 is a block diagram illustrating a computer system that is used to send or receive messages in one embodiment of the present invention.

FIG. 1 is a block diagram illustrating a computer system 100 that is used to send or receive messages in one embodiment of the present invention. A processor 102 is connected to an input interface 106 and an output interface 108. Input interface 106 provides an interface to a user input device such as a keyboard and output interface 108 provides an interface to an output device such as a screen. Processor 102 is also connected to a data storage system 109. Processor 102 is connected to a network 112 via a network interface 110 that includes an input and output interface. Encapsulated transaction messages are sent and received by computer system 100 over network 112 to and from other computer systems connected to network 112 which may be similarly configured.

As mentioned above, in a transaction processing system, messages may be sent among numerous parties in order to execute a single transaction. These parties may be running different hardware configurations as well as different software configurations, which in some cases may be proprietary software configurations. The different parties to the transaction may or may not have had an opportunity to assure the full mutual compatibility of their hardware and software systems. Insuring such mutual compatibility among a large number of parties, some of whom have no direct relationship to each other, is a complex and time consuming process. Messages sent from one party to other parties may be interpreted in different ways according to the software protocols and templates that exist on the computer system at each location. To ensure that messages are referred to and interpreted correctly, a detailed encapsulated message format is specified that allows a party to send a message and to encapsulate the message with together with additional information that specifies how the party expects the message to be parsed, accepted, interpreted and acknowledged.

Figure 2:
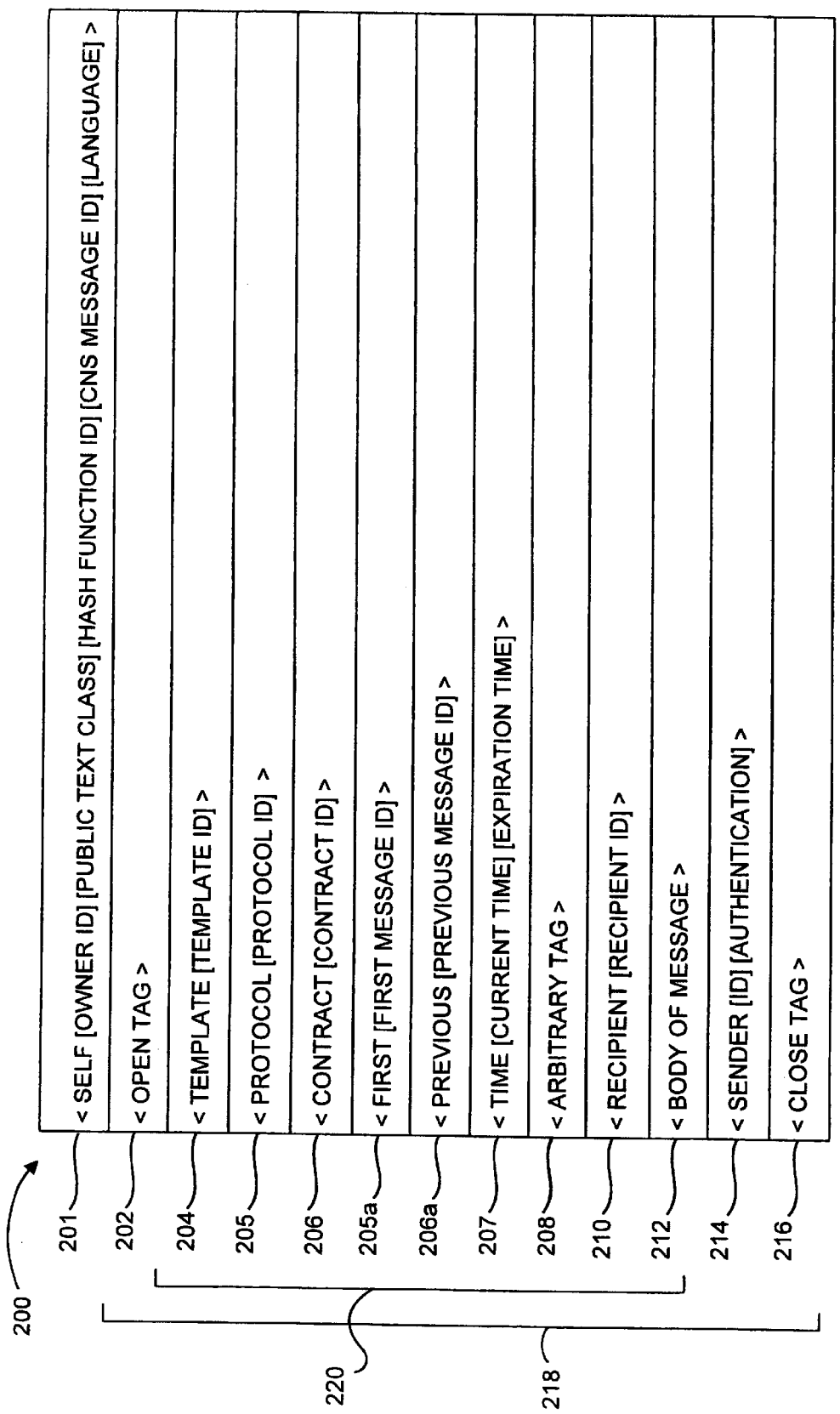
FIG. 2 is an encapsulated message data format specification illustrating how the body of a message is encapsulated with a set of verifiable reference pointers that reliably specify interpretation data.

FIG. 2 is an encapsulated message data format specification illustrating how the body of a message is encapsulated with a set of verifiable reference pointers that reliably specify interpretation data which may be stored in an interpretation file that describes how the message is to be interpreted. In addition to the verifiable reference pointers and the body of the message, other system data items such as time stamps or sender authentication may be included in a message set. The message set is encapsulated together with a message ID that verifiably identifies the message set.

The verifiable reference pointers and the verifiable message ID are referred to as common name space "CNS" identifiers or CNS ID's. CNS ID's reliably and verifiably identify data because they are generated as a function of the data that is referenced or identified. In one embodiment, one or more cryptographic hash functions are used to create CNS ID's. The data to be identified, whether it be a message, template, protocol, contract, or some other form of document, is used as an input to a cryptographic hash function. The result of applying the cryptographic hash function to the input is a CNS ID. The CNS ID is verifiable because it is derived from the content of the data which it identifies. Another way of expressing this is that the CNS ID is "data generated", since the name used to identify the data is generated as a function of the data itself. It is possible, given the content of the data that is identified or named by the CNS ID and the cryptographic hash function used to derive the CNS ID, to determine whether or not the CNS ID belongs with the data or whether the data has been misnamed.

Figure 3:
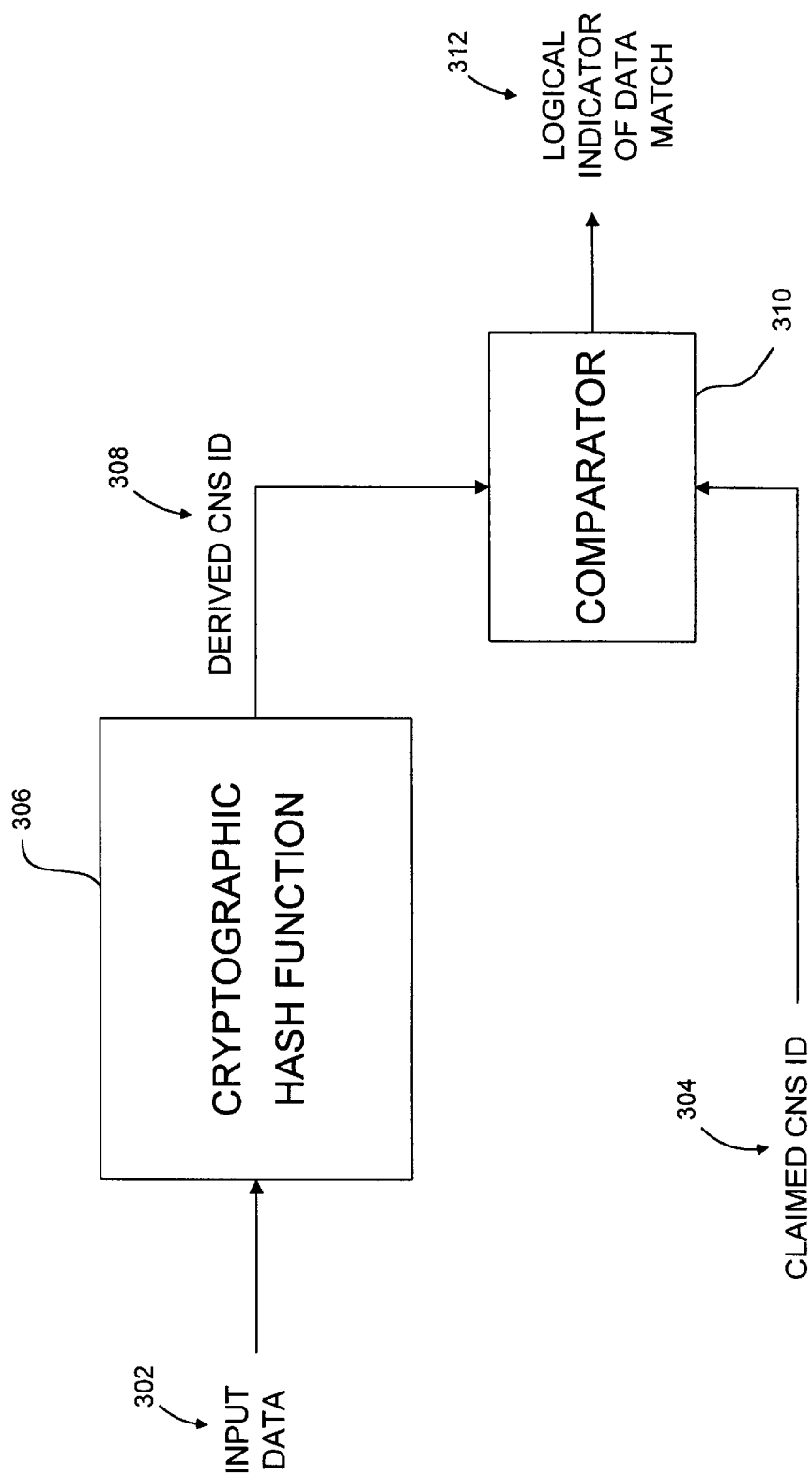
FIG. 3 is a system diagram illustrating a system for creating a CNS ID and comparing it to a CNS ID that is encapsulated with a message set that is received.

FIG. 3 is a system diagram illustrating a system for creating a CNS ID and comparing it to a CNS ID that is encapsulated with a message set that is received. Input data 302 is either received by a party or retrieved from storage by that party. A claimed CNS ID 304 that is claimed to identify input data 302 is also received by the party as part of a message. The party may desire to verify that the claimed CNS ID matches input data 302. To accomplish this, input data 302 is input to a cryptographic hash function 306. The output of cryptographic hash function 306 is a derived CNS ID 308 which is now known by the party to be the proper CNS ID for input data 302. Both derived CNS ID 308 and claimed CNS ID 304 are input to a comparator 310. The output of comparator 312 is a logical indicator of whether or not the input data matches the claimed CNS ID. Thus, the CNS ID is verifiable because it is a data generated ID. Given input data and a specific cryptographic hash function, the CNS ID for the input data may be derived.

The properties of the cryptographic hash function used in one embodiment are that it is one way and collision free. An exact definition of these terms, as well as descriptions of suitable hash functions may be found in *Applied Cryptography* by Bruce Schneier, Wiley 1996, which is herein incorporated by reference for all purposes. Because the cryptographic hash function is one way, it is not computationally feasible to derive the input data from the CNS ID. Because the cryptographic hash function is collision free (actually, in most embodiments, it is required only that the cryptographic hash function is only computationally collision free and it should be noted that collision free as used herein is intended to mean computationally collision free), it is computationally infeasible to find different CNS ID's that correspond to the same input data. It should be noted that, in certain embodiments, these requirements of the cryptographic hash function may be relaxed. For example, in certain applications, it may not be necessary to provide a one way hash function. However, it is preferred that the cryptographic hash function be both one way and collision free so that data cannot be derived from message ID's and so that message ID's adequately distinguish different data.

CNS ID's are useful both to identify messages and to positively identify data files which are stored by different parties and which describe how messages are to be parsed, interpreted, acknowledged and acted upon. For example, consider two parties where the first party sends the second party a message. If the first party arbitrarily assigns the message a name such as "123" that is not data generated, then the second party can send a confirmation of having received message 123 and neither party may be certain that the correct message was in fact received. This is because the second party could have received a message which was mistakenly labeled 123 and is in fact confirming receipt of the mistakenly labeled message. The use of a CNS Identifier avoids this problem since a message mistakenly labeled with the CNS Identifier from another message will not correctly hash to the CNS ID which is used as the name of the message.

Furthermore, if the hash function is a cryptographic hash function as described above, the sender of the message can hold the receiver to his commitment that he has received the message and that he has received the right message. Since the cryptographic hash function is used, the receiver cannot derive a second message which he claims to have received and which hashes to the CNS ID that accompanied the first, true message. When the receiver commits that he has received the message that corresponds to the CNS ID, then the receiver has specified in a reliable manner the message that he received and he cannot later claim to have in fact received a different message. Thus, the use of a CNS ID provides reliable confirmation of the receipt of a message and, when a cryptographic hash function is used, the CNS ID ensures that a receiver cannot disclaim a confirmation of receipt by asserting that he received a different message.

Another way that a transaction message could be confused is if the right message is received, but it is not interpreted correctly. This could occur for example when a template is used that assigns certain meanings to certain parts of the message that occur in a certain order. For example, a message that states a commitment to pay certain amounts between different parties upon payments of other amounts among the parties could be misunderstood if the order of various parties or amounts were transposed. Such a transposition could occur if different templates specifying different orders for items in the message body were used to interpret the messages by different parties sending and receiving messages. Using CNS Identifiers to specify data such as template data used to interpret messages prevents such confusion from occurring and enables parties to make an unambiguous commitment to using a certain template and prevents parties from backing out such commitments.

For example, if a first party sends a message to a second party and encapsulates the message along with a CNS ID of the template data file that the sending party intends to be used to interpret the message, then the receiving party can confirm that the data file that contains the template that he is using to interpret the message hashes to the template CNS ID. Once the receiver has made a commitment to the sender that he has the template corresponding to the template CNS ID, he then cannot back away from that commitment if a cryptographic hash function is used, because he cannot computationally feasibly find an alternative template file that hashes to same template CNS ID.

Returning to FIG. 2, an encapsulated message 200 is illustrated that is created by encapsulating a message body with a message CNS ID, CNS ID's that identify interpretation data files used to interpret the message body, other message information items, and a message CNS ID. A message set includes the body of the message as well as CNS ID's of interpretation data files and other message information items such as time stamps or sender authentication information that are encapsulated with the message. In the transaction processing system, a message set is referred to as a transaction message. A message ID is a CNS ID that is derived from the contents of the message set, as is shown below, so that the message ID identifies an entire message set, including the body of the message as well as the items or tags encapsulated along with the body of the message in the message set. In certain embodiments, a body message ID may be derived that identifies only the message body; such an ID is generated in addition to the identifier of the message set. As is generally used herein, the message ID refers to a CNS ID that identifies the message set. An encapsulated message includes the message set, along with the message ID.

Interpretation data files include data files or documents that are used to interpret the message or to determine the context of the message or how the message should be handled and acted upon. They include template files, protocol files and contract files. The inclusion of CNS ID's for message interpretation files in the message set allows the message receiver to verify that the message interpretation files stored by the message receiver match the ones specified by the message sender.

In one preferred embodiment, each item encapsulated with the message, as well as the body of the message itself, is specified as a tag that is delimited by <>. In such an embodiment, SGML is preferably used to transfer messages between parties. Most of the examples shown below will correspond roughly to SGML format, with message items shown as tags, but it should be appreciated that other data transport formats are also used in accordance with the present invention. For example, encapsulated messages could be sent via email, as part of a TCP session, as part of an SSL session, via telex, by HTML, or by a means that includes non-electronic transport media such as a combination of a facsimile and OCR software. Thus, although the use of SGML is preferred, the invention is not limited to SGML. Message items included in a message set will interchangeably be referred to as message items or message tags. A discussion of sending data via SGML using proper SGML format may be found in *The SGML handbook* by Charles Goldfarb Oxford University Press, 1990. Certain SGML syntax will be omitted in the discussion of the message set to avoid unnecessarily obscuring the invention in SGML detail.

Referring next to FIG. 2, the first items shown in encapsulated message 200 is a self tag 201. 201 names the name, "SELF" which identifies the tag as a self tag. Next, the self tag contains an SGML formal public identifier, which is used to format a CNS message ID for inclusion in SGML. A formal public identifier consists of an owner identifier, a public text class, a hash function identifier, a CNS message ID, and a public text language identifier. The owner identifier may be registered with ISO or may be unregistered. Next, the public text class is provided in conformance to the SGML specification as an indicator for the interpretation of the referent data. Generally, the key work "TEXT" is used and the key word "DOCUMENT" is also used to specify template protocol and contract files. Next, a hash function ID is provided that identifies the particular hash function used to create the CNS ID for the message set. Next, the CNS message ID is provided. Finally, a public text language identifier is provided to identify the language used. English is used in the example shown.

It should be noted that the SGML specific portions of the self tag such as owner ID, public text class, and language are provided here for the purpose of illustration only. These are shown for the self tag to illustrate how the transaction processing system methodology includes the CNS message ID along with the required SGML portions of the self tag in one embodiment. In the remaining tags shown, SGML specific required fields will be omitted in order to avoid obscuring the present invention with excessive detail about SGML. It will be apparent to a person familiar with SGML when and where SGML specific syntax should be inserted. In particular, every CNS ID is formatted as an SGML formal public identifier in one preferred embodiment.

Returning again to FIG. 2, Encapsulated message 200 next contains an open tag 202. Open tag 202 and a close tag 216 together delimit the message set for which the self tag functions to provide the CNS message ID. Next, encapsulated message 200 includes a template tag 204 that provides a template CNS ID, a protocol tag 205 that provides a protocol CNS ID, and a contract tag 206 provides a contract CNS ID. The purpose of the template, protocol, and contract CNS ID's is to verifiably identify the template, protocol, and contract which should be used to interpret the encapsulated message. An example of a template is shown below:

Pay to the order of_____A_____ the amount _____B_____ from the account of_____C_____.

Protocol and contract tags are generally provided for a first message in a message sequence. After the first message, subsequent messages contain a previous tag 205a and a first tag 206a. The previous tag 205a is the CNS identifier of the immediately preceding message in the sequence of messages. This tag enables the processor to ensure that every message in a sequence or chain of messages has been received. In addition, the first message tag is the CNS identifier of the first message in the message sequence, which is also necessary to provide context for the current message and to ensure that each message in the chain of messages has been received.

This template would specify that the first data item received in a body of a message is expected to be the payee, the second data item is expected to be the amount, and the third data item is expected to be the payor. It should be noted that in certain embodiments the message body would not include the text shown in the template and would only include the payee, amount, and payor, and in other embodiments, the message body could include the template text as well as the fields shown in order to facilitate messages being read by humans without needing to be joined to a template file.

A protocol file is used to specify a protocol under which the message is being sent. A protocol may specify certain responses that are required or expected by the sender or certain ways that the message is expected to be handled by the receiver. The use of protocols varies in different embodiments. A contract file specifies an agreement among the parties under which the message is being sent. The contract may include as part of its provisions the agreement of the parties to operate under a certain protocol and accept certain templates of certain predefined format. It should be noted that in certain embodiments, templates, protocol, or contract files may be omitted and template, protocol, or contract CNS ID's may be omitted from encapsulated messages. However, the inclusion of all three is preferred and provides power and flexibility in defining how messages are interpreted, what response is expected, and the state of the agreements between the various parties.

A significant feature of the system is that template, protocol, and contract files need not be communicated electronically between the parties each time a transaction is initiated or transaction messages are received. Template, protocol, and contract files are preferably stored by each party in a database. When the party receives an encapsulated message containing template, protocol, and contract CNS message ID's, the party checks its database to determine whether it has corresponding template, protocol, and contract files that hash to the CNS message ID's. As a practical matter, the party, in most cases, does not hash the files as messages come in but rather hashes all the files that it possesses once and records a list of CNS ID's for each of its files in a database. Once the message receiver confirms that it has a file in its database corresponding to each of the template, protocol, and contract CNS ID's which are encapsulated in a message, and that it is willing to accept messages from the sender, the message receiver can send a confirmation to the message sender. At that point, it is unambiguously clear that the two parties are in agreement about the template that will be used to interpret the message, the protocol that will be followed in handling the message, and the contract under which the parties are operating.

Encapsulated message 200 preferably also includes a time tag 207 which provides a value for the current time and a value for an expiration time. The use of these times may be specified for the parties by a protocol or a contract. For example, the current time may store the time that the message was sent by the sender. The controlling contract or protocol may specify a maximum skew time, that is the time difference between the claimed current time that the message was sent and the time that the message is received by the receiver. If the skew time is exceeded, the protocol specifies a procedure for sending an error message to the message sender indicating the occurrence of that event. The expiration time is used to specify the maximum time for a response to the message. In one embodiment, messages are rejected if the expiration time is too close to the time of receipt (i.e., the receiver is not given enough time to respond), or if the expiration time is too long after the time of receipt. It is desirable to reject messages which have too long of an expiration time because in some embodiments the expiration time is used to determine how long messages must be stored and the receipt of a large number of messages with very long expiration times could overwhelm the storage capacity of the system.

Encapsulated message 200 also includes an arbitrary tag 208. The purpose of arbitrary tag 208 is to provide arbitrary information in the encapsulated message that enables encapsulated messages which are otherwise identical to be distinguished. Arbitrary tag 208 may also be used to provide a serial number used to distinguish messages that are recent from prior messages containing the exact same information. A recipient tag 210 provides a recipient CNS ID. The recipient ID is used in cases where the receiver of the message is not the final recipient, that is, the entity which is legally bound to respond to or act upon the message. This would be the case, for example, where an agent or proxy is designated to receive messages for a third party and to verify receipt before passing message along. The body of the message is contained in a tag 212.

In some embodiments a sender tag 214 is provided. Sender tag 214 includes a sender ID that identifies the sender as well as a sender authentication attribute. In certain embodiments, the sender ID and sender authentication may be combined or authentication may be omitted if, for example, the network being used is secure and the presence of the sender on the network is sufficient to authenticate the sender. Benefits are realized, however from providing the sender ID separately from authentication. In a preferred embodiment, the authentication is provided by the sender signing a hash of a portion of the encapsulated message with his private key. In one embodiment, the portion of the message that is hashed and signed by the sender is message portion 220. Finally, the close tag 216 indicates the end of the encapsulated message.

As noted above, self tag 201 includes a CNS message ID. the CNS message ID is a cryptographic hash of the message set, which includes the tags shown in FIG. 2 as message portion 220. Thus, the message set that is hashed includes the including the sender ID and the close tag. Therefore, when the receiver confirms a message by and identifies the message with the message ID, the receiver is not only confirming receipt of the message body and message interpretation ID's, but is also confirming receipt of the user ID and user authentication.

It has now been shown that a message, the contents of which are described in tag 212 which contains the body of the message is encapsulated with numerous other tags that specify how the message is to be interpreted, how the message is to be handled and responses made, the contract under which the message is sent, the time of sending, the message recipient, and the sender. In addition, arbitrary information may be included along with the message so that otherwise identical messages can be distinguished. The encapsulation of this information along with a message ensures that parties dealing with each other electronically can be certain that individual messages will be handled in an agreed upon manner. This is true even for parties who have perhaps not exhaustively ensured that their systems are completely compatible. Furthermore, the inclusion of a CNS message ID in the self tag and the use of a cryptographic hash function to derive the CNS message ID ensures that parties can confirm that the message referred to by the CNS message ID is in fact the same message.

PARSING RAW MESSAGES, VERIFYING IDEMPOTENCY, AND VALIDATING TRANSACTION MESSAGES

Figure 4A:
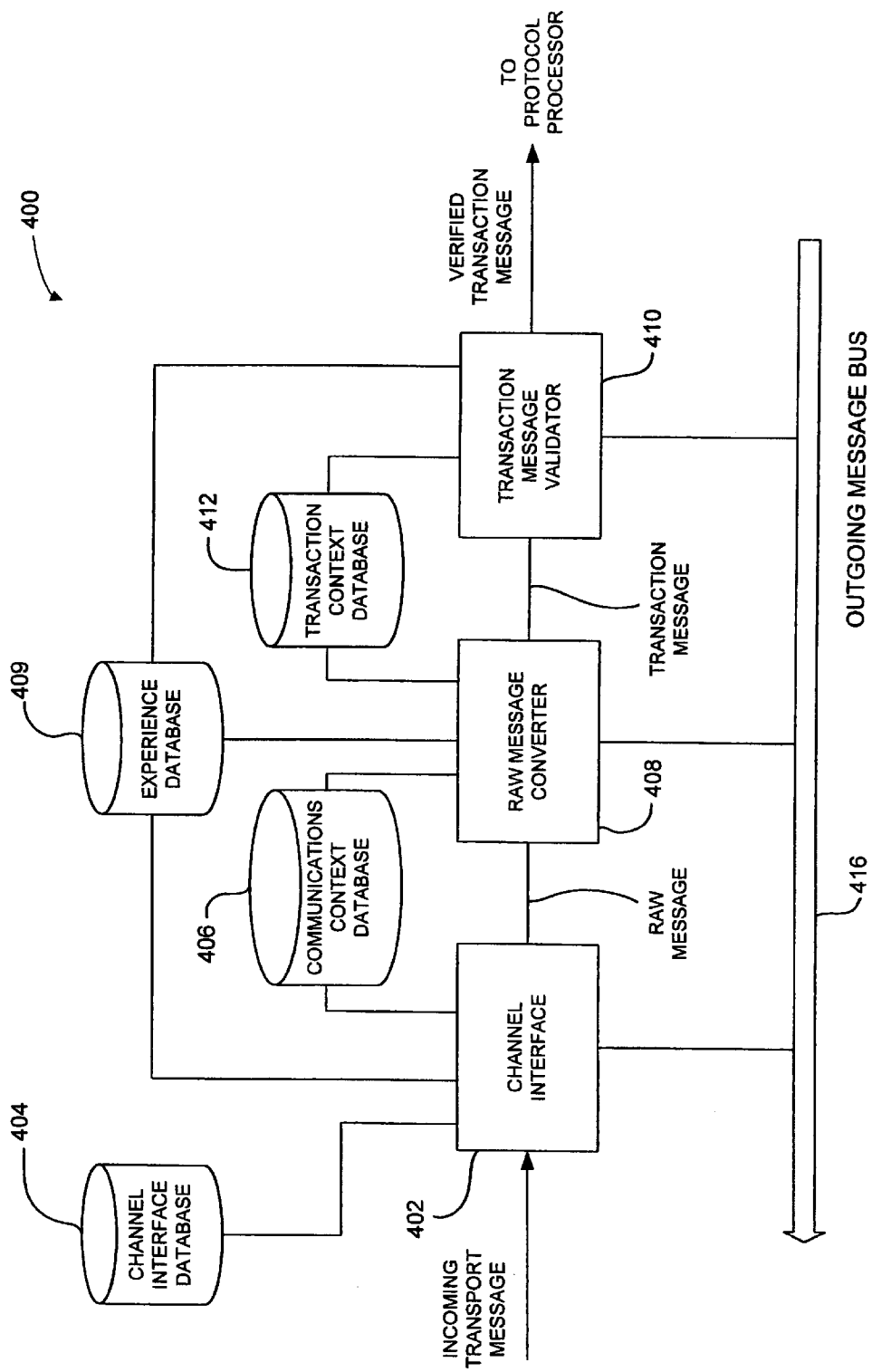
FIG. 4A is a block diagram illustrating a system for receiving an incoming transport message from a data channel, parsing a raw message into transaction messages, checking the idempotence of messages, and verifying transaction messages.

FIG. 4A is a block diagram illustrating a system for receiving incoming transport message from a data channel, parsing the raw message into transaction messages, checking the idempotence of messages, and verifying transaction messages. The system is designed to handle messages of the format that is described in FIG. 2 and the system may be implemented on processor 102 shown in FIG. 1 with messages being received from network interface 110 and the various databases described below being stored in data storage 109.

The system is referred to as an input message decoding and verification system 400 because it transforms an incoming transport message which may contain multiple transaction messages or partial transaction messages, parses the messages, and verifies that the messages are valid transaction messages. A Channel interface 402 is connected to a channel interface database 404. Channel interface database 404 is used to keep track of incoming transport messages. Channel interface 402 outputs a raw message stream of data that may contain multiple or partial transaction messages, together with a raw message ID that is included in a communication context ID. The main function of channel interface 402 is to interact with a communication data channel to receive incoming transport messages according to whatever message transport protocol is being used by the network to which input message decoding and verification system 400 is connected. The raw message ID is a CNS identifier that is generated by using a cryptographic hash function to hash the entire contents of the raw message. A format which may be used for the raw message ID is:

<RAW MESSAGE[hash function id][RAW MESSAGE CNS ID]>

The raw messages ID thus is similar to the self tag 201 shown in FIG. 2. The raw message however, may contain a number of individual message sets that correspond to transaction messages and may also contain partial transaction messages.

Channel interface 402 receives transport messages from a data channel. The channel interface has a responsibility of taking off the transport layer packaging and removing any encoding that a raw message received for transport. In some embodiments, raw messages include multiple transaction messages that are combined into concatenated strings. Channel interface 402 is connected to a communication context database 406. Communications context database 406 is further described in FIG. 5A. In the following discussion, the word database is used to refer to logically organized group of data. Each database referred to can be implemented as one or more tables in a relational database or in a file system format for long term storage. In a complete system, particularly on a client implementation, certain of the databases shown in FIG. 4A may be combined to use common storage.

The purpose of communications context database 406 is to pass some of the context of the received raw messages in order to make it possible to bind transaction messages to their origins in a specific communication event. In different embodiments, different items of information are provided in the communications context database. In one embodiment, the channel interface passes its own identifier and a time stamp through a communications context database. Other information is provided in certain other embodiments including a CNS identifier of the transport message, IP numbers if the channel uses the IP protocol, the security policy of the channel (e.g., SSL connection), or other channel specific information which may be useful. In addition, the raw message or a raw message CNS ID may be stored in the communications context database as well.

The output of the channel interface is a raw message. The raw message may contain a number of individual candidate transaction messages and error segments. Generally, the raw message will include a number of complete transaction messages followed by an error segment. Usually, the error segment will be empty. The rest of the raw message after the error segment is also considered an error. A raw message converter 408 parses the raw message into individual transaction messages. The structure of raw message converter 408 is described in further detail in FIG. 4B.

Figure 4B:
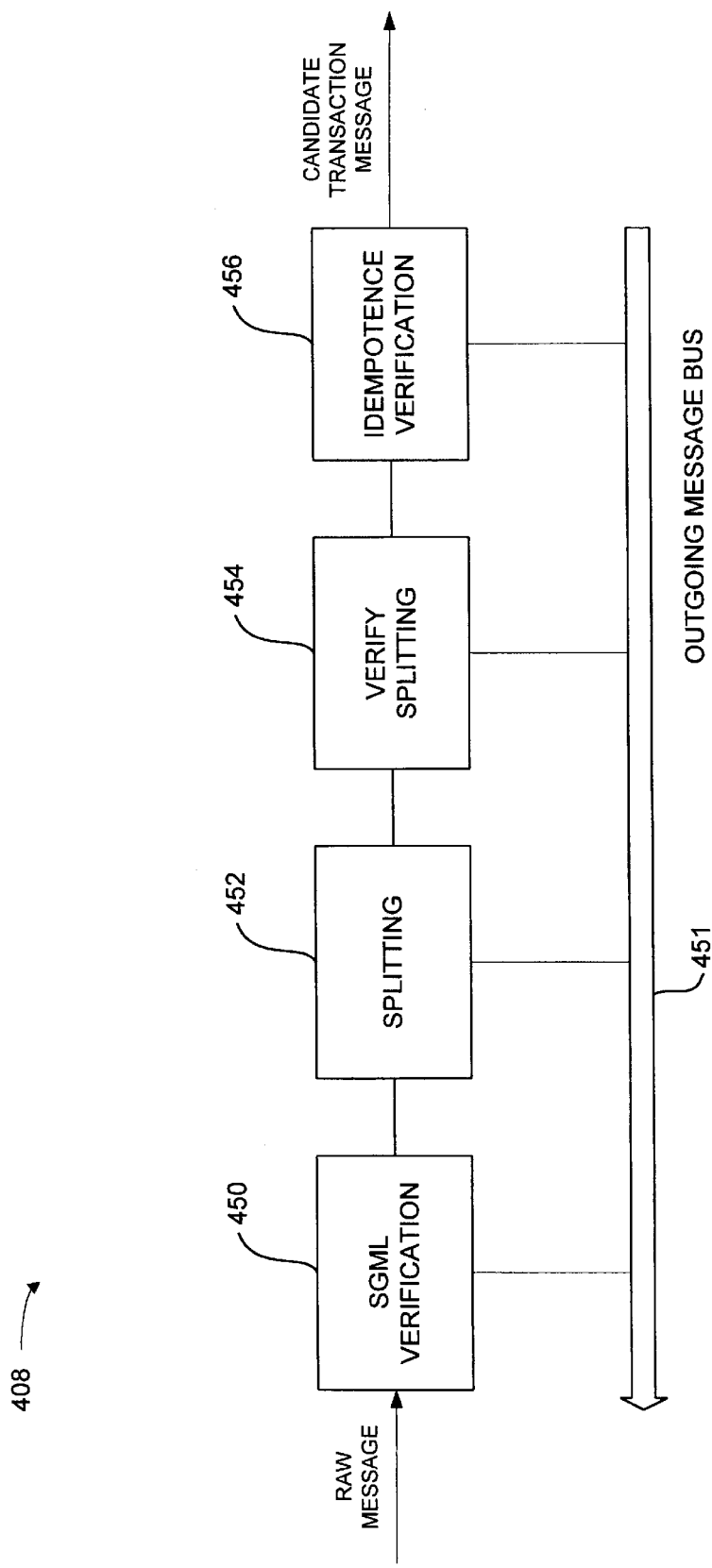
FIG. 4B is a block diagram illustrating the internal structure of the raw message converter.

FIG. 4B is a block diagram illustrating the internal structure of raw message converter 408. A raw message is input into an SGML verification block 450. SGML verification block 450 verifies that the SGML code which is used to carry the tags which include the message body tags and other message item tags encapsulated with the message body is in proper form. If an error is detected in the SGML code, then the position where the error was detected is communicated back to the source in an error message that is passed along an outgoing error message bus 451 and the beginning of the message up to the part where the error was detected is passed on to a splitting block 452. Splitting block 452 divides or parses the message into individual candidate transaction messages.

If splitting block 452 reaches an incomplete candidate transaction message, then it sends an error message that is passed along outgoing error message bus 451 detailing the point at which the incomplete message was detected. The output of splitting block 452 is sent to a verify self tag block 454. Verify self tag block 454 checks that the hash value given in the self tag as the CNS identifier of the candidate transaction message is in fact the hash of the candidate transaction message using the specified hash function. If it is not then an error message is passed along outgoing error message bus 451. The output of verify self tag block 454 is sent to an idempotence verification block 456. Idempotence verification 456 checks the candidate transaction message against an experience database 409 to make sure that an identical message has not been received already. Experience database is described in further detail in FIG. 5B. If an identical message has already been received then the message is considered to be a duplicate message and an error message is passed along outgoing error message bus 451. Duplicate messages can be sent as a result of a resend from the sender or some other error.

The term idempotence is a mathematical term indicating that the receipt of two identical messages is equivalent to the receipt of a single message. It is necessary to detect the duplicate messages and not send them on to the protocol processor where they might result in repeated executions of a transaction. The output of idempotence verification block 456 is sent to transaction message validator 410.

Raw message converter 408 thus divides the raw message into a series of candidate transaction messages, verifies that the self tag of each candidate message is correct, and makes sure that each candidate message is not a duplicate message. The output of raw message converter 408 is one or more candidate transaction messages which are sent to transaction message validator 410. Both raw message converter 408 and transaction message validator 410 are connected to a transaction context database 412. Transaction context database 412 is described in further detail in FIG. 5C.

Transaction context database 412 contains information about candidate transaction messages and their disposition. Generally, as each test is performed on a message such as the verily self test and idempotence test, the result of the test is stored in the transaction context database. In one embodiment, the candidate message ID and raw message ID are combined in a separate candidate transaction message disposition database that is accessed by 408. The candidate transaction message disposition database also keeps track of whether the candidate message has been checked that its CNS ID is correct. Experience database 409 stores a raw message ID and a transaction message ID for each message that is received by 400. The transaction message itself may is also stored in experience database 409. Transaction context database 412 also contains information about the status of various message checks performed in transaction message validator 410. These include context verification, message expiration, and signature verification. The detailed structure of transaction message validator 410 is further described in FIG. 4C.

The output of transaction message validator 410 is a verified transaction message that is sent to a protocol processor. The verified transaction message is a valid transaction message that has been split from a raw message stream and for which the message CNS ID contained in the self tag of the encapsulated message has been verified. In addition, the other CNS Identifiers encapsulated with the message as tags are also confirmed. Thus, the output of verification system 400 is ready to be processed according to a specified protocol. At each stage, any errors that are detected by the various checks which are performed may be sent to the sender of the message via an outgoing message bus 416. In addition, the event of a successful identification of a verified transaction message may be communicated to the sender via outgoing message bus 416.

Figure 4C:
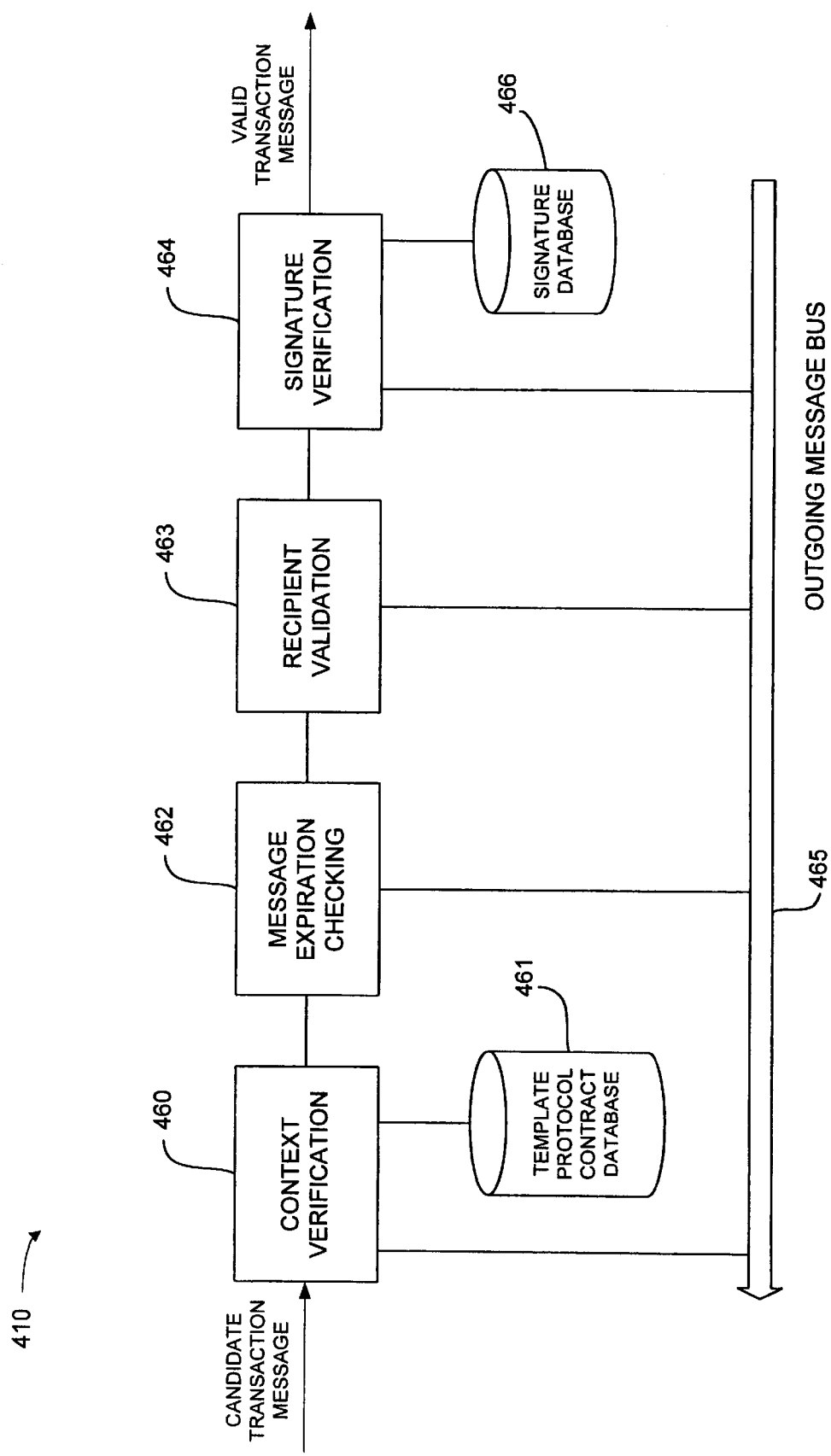
FIG. 4C is a block diagram illustrating the detailed structure of the transaction message validator.

FIG. 4C is a block diagram illustrating the detailed structure of transaction message validator 410. A context verification block 460 checks that the transaction message declares a valid template. For messages that are not the first message of a message sequence, context verification block 460 also checks that the message is in a proper sequence. For first messages, the protocol and contract ID's are checked. A database 461 containing template, contract, protocol files is access by context verification block 460 to check template, contract, and protocol ID's.

To do this, it is checked that the previous tag encapsulated with the transaction message corresponds to a message that was already received or sent and noted in experience database 409. Experience database 409 thus plays an important role not only in identifying duplicate or repeated messages, but also in checking the context in which a message is received. Using the data in Experience database 409, the processor makes sure that a previous message exists if one is specified in a tag that is encapsulated with a message. In addition, Experience database 409 may also store raw messages as they are sent and received so that it is possible at a later time to determine the manner in which a well formed message was encapsulated. If a message fails context verification, then an error message may be sent along an error message bus 465 immediately or the message may be kept for a certain period of time to see if the preceding message missing from the chain is later received.

Once the context of the message is verified by context verification block 460, the message is passed to a message expiration checking block 462. If the message fails expiration checking, then an error message is sent along an error message bus 465. The output of message expiration checking block 462 is sent to a recipient validation block 463. Recipient validation block 463 is used in certain embodiments where the final recipient of the message is different from the message receiver, as is further described below. If the recipient is not valid, then an error message is sent along an error message bus 465. The output of recipient validation block 463 is sent to signature verification block 464. Signature verification block 464 verifies that the sender authentication is correct. In some embodiments, a signature verification database 466 is dedicated to 464. If the signature is not valid, then an error message is sent along an error message bus 465. The output of 464 is a valid transaction message. For the valid transaction message, it has been verified that the message ID contained in the self tag is correct and that all of the encapsulated tags with the message body correctly refer to items which are stored by the receiver. Furthermore, it has been verified that the message is not a duplicate, that is, it has not expired and that it is received in correct sequence with other messages referenced by it.

As noted above, information about data passing through the channel interface, the raw message converter, and the transaction message validator is stored in the channel interface database, the communications context database, and the transaction context database. FIG. 5A is a data structure diagram illustrating data stored in the communications context database. A transport message field 502 received over the data channel is stored as well as a channel identifier field 504 that identifies the channel on which the transport message was received. A time stamp field 506 indicates when the transport message was received.

One or more fields such as a field 508 for storing channel specific information may also be included. A raw message field 510 and the raw message CNS ID field 512 are also included. A context CNS ID is created that is a hash of the raw message plus other context information. The offset location of messages within the raw message in included as an offset field 516. The number of messages is included in the raw message is stored in a splitting data field 518 other data about how messages are split is included in a field 520. A candidate message ID field 522 stores a candidate message ID created by hashing each candidate message. The substring indices corresponding to the position of the candidate messages within a raw message string are stored in a field 524.

A candidate message check flag is stored in a field 526. The candidate message check flag indicates whether or not the candidate message has been checked. An error messages generated field 528 indicates whether an error message has been generated. In some embodiments, the candidate message ID, substring indices, candidate message check flag, and error message generated flag are included separately in a candidate transaction message disposition database.

Figure 5B:
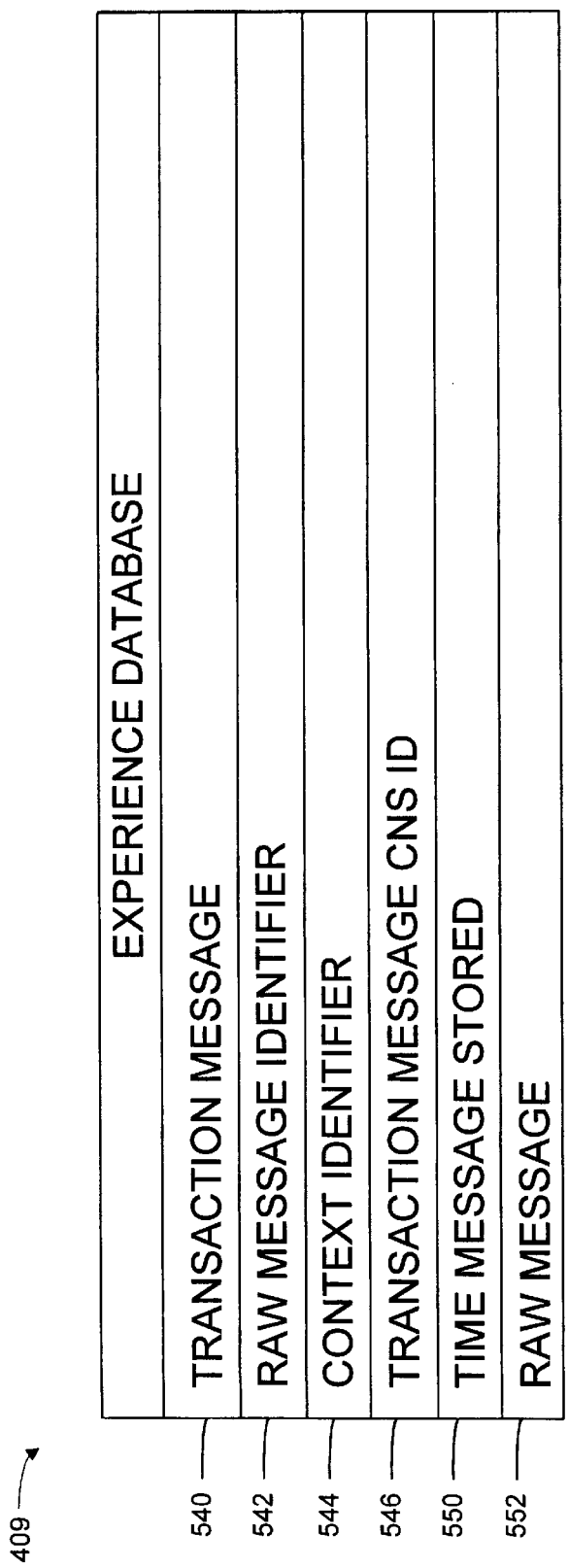
FIG. 5B is a data structure diagram illustrating the database fields stored in the Experience database.

FIG. 5B is a data structure diagram illustrating the database fields stored in Experience database 409. Experience database 409 keeps track of all the messages that the processor has seen. The transaction message is stored in a field 540. The raw message identifier is stored in a field 542. The context identifier is stored in a field 544. In some embodiments, the context identifier replaces the raw message identifier or else includes the raw message identifier. The transaction message CNS ID is stored in a file 546. The time that the message was stored is stored in a field 550 and the raw message itself is stored in a field 552.

FIG. 5C is a data structure diagram of transaction context database 404. The transaction message ID is stored in a field 560 and a communication context ID is stored in a field 562. A message reply flag 564 indicates whether or not the message has received a reply. A list of the message ID's which have been generated in response to the transaction message is stored in a field 566. A flag 568 indicates whether message processing is complete. A template ID is stored in a field 570. A first message flag stored in a field 572 indicates whether the message is a first message in a message sequence. For a message which is a first message, the protocol ID is stored in a field 574, and the contract ID is stored in a field 576. For a message which is not a first message, the first message in the message sequence is stored in a field 578 and the previous message in the message sequence is stored in field 580.

The receiver ID is stored in a field 582 and the sender ID is stored in a field 584. The expiration time of the message is stored in a field 586 and the time at which a transaction message was created is stored in a field 588. This time corresponds to when the idempotence of the transaction message was successfully checked. Thus, the databases discussed above provide access to all the information that is needed to verify a transaction message and to send error messages back to the message sender when appropriate.

So far, a message format has been described for encapsulating information about the interpretation of a message with a message and also for providing a verifiable message ID. A system for parsing transaction messages from raw messages and validating transaction messages has also been disclosed. Various databases are used to store information about raw messages and transaction messages as they are processed by the system. The processes running in each of the system blocks shown in FIGS. 4A, 4B, and 4C are described below.

Figure 6:
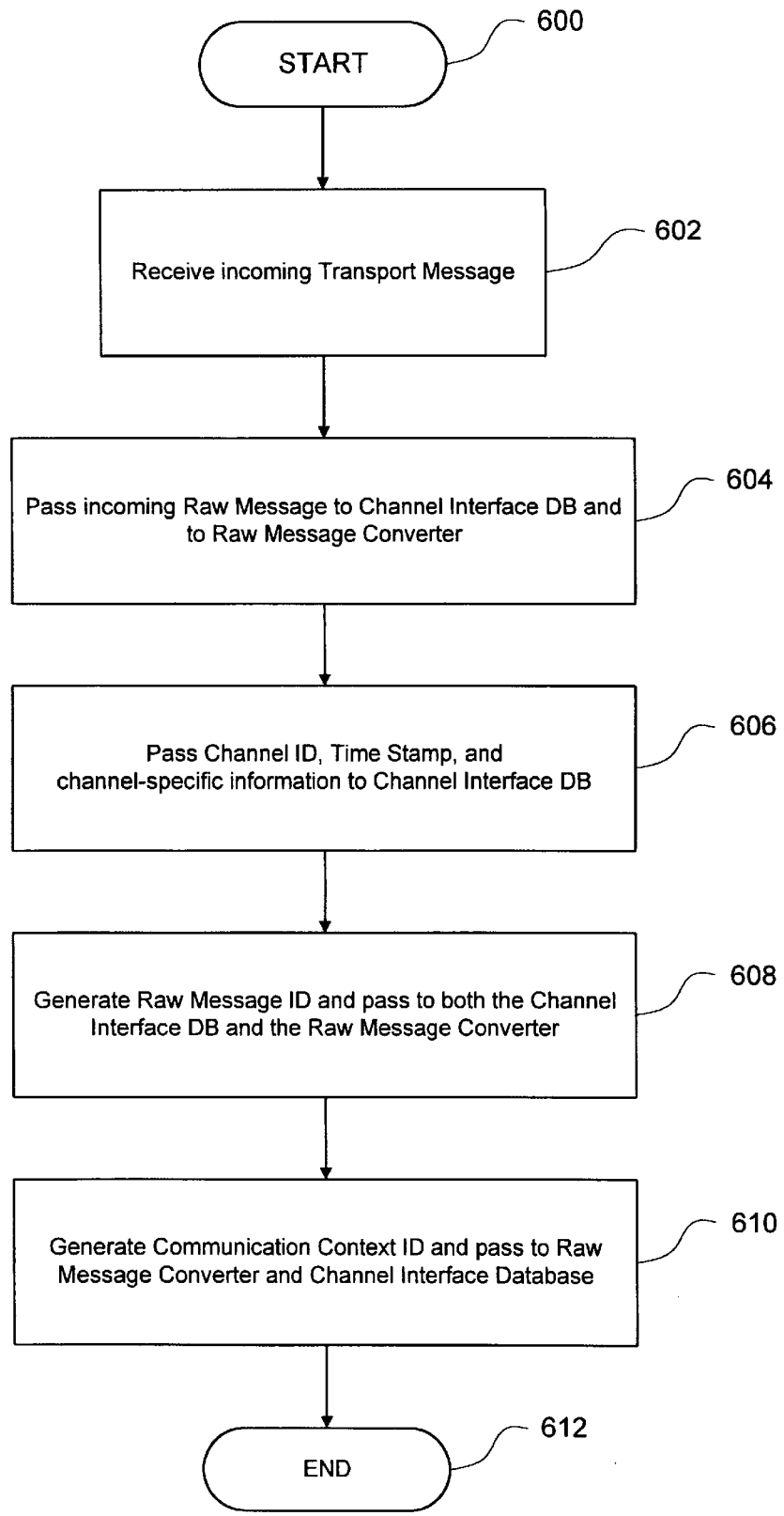
FIG. 6 is process flow diagram illustrating the process running on the channel interface .

FIG. 6 is process flow diagram illustrating the process running on channel interface 402. The process starts at 600. In a step 602, an incoming transport messages is received. In a step 604, the incoming raw message is passed to the channel interface database and to the raw message converter. Next, in step 606, the channel ID, time stamp, and channel specific information are passed to the channel interface database. In a step 608, a raw message ID is generated and passed to both the channel interface database and the raw message converter. Next, in a step 610, a communication context ID is generated. The communication context ID is a CNS ID generated for the raw message combined with the source information and channel information. The communication context ID is passed to the raw message converter and also to the channel interface database. The process ends at 612.

Figure 7A:
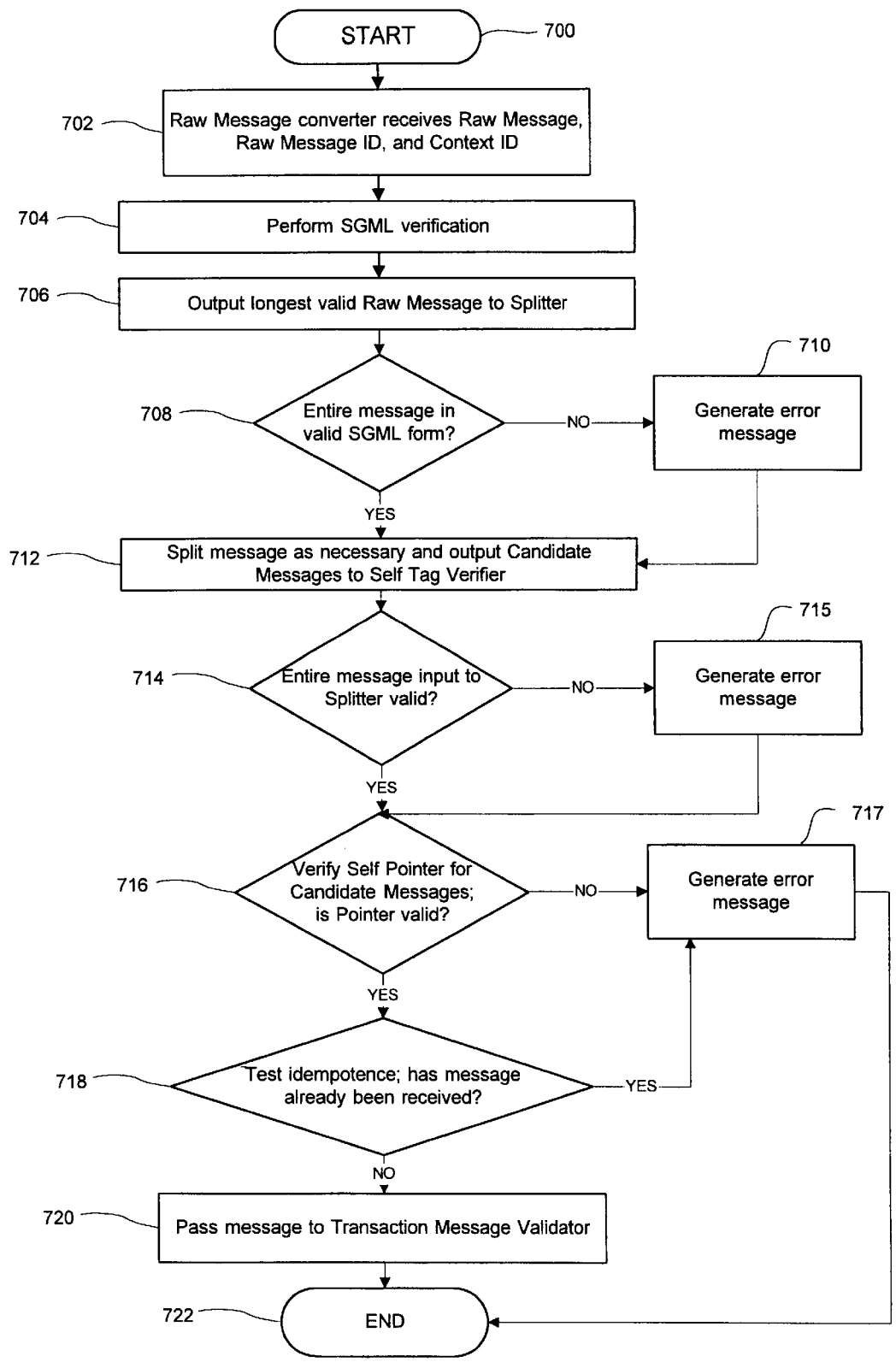
FIG. 7A is a process flow diagram illustrating a process implemented on the raw message converter.

FIG. 7A is a process flow diagram illustrating a process implemented on raw message converter 408. The process starts at 700. In step 702, the raw message converter receives a raw message, a raw message ID, and a context ID. Next, in a step 704, the raw message converter performs SGML verification. One system for performing SGML parsing and verification is disclosed in version 1.1.1 of James Clark's package SP, which is currently available at ftp://ftpjclark.xorn/pub/sp and which is herein incorporated by reference for all purposes. Next, in a step 706, the longest valid SGML initial substring of the raw message is output to the message splitter. In a step 708, it is checked whether the entire message is in valid SGML form. If it is not, then an error message is generated in a step 710 and then control is transferred to step 712.

It should be noted that in certain of the following process flow diagrams, error message generation for several different errors is shown in a single step. This is not intended to imply that all error messages are the same. Generally, error messages include as much detail as is possible. For example, if the entire message is not in valid SGML form, then the error message generated in step 710 indicates the point in the message at which non standard SGML form was detected. Error message generation steps are intended to be interpreted as generating the appropriate error message given the event that caused control to be transferred to the error message generation step.

If the entire message is in valid SGML form, control is transferred to a step 712 and the message is split as necessary and the resulting candidate messages are output to the self tag verifier. Step 712 is described in further detail in FIG. 8. It should be noted that in some embodiments, the portion of the raw message that is in valid SGML form is transferred to the message splitter and split as required regardless of whether or not the entire message is in valid SGML form. That is, is much of the message that is in valid SGML form is transferred to the message splitter and split into valid candidate messages, if possible. Next, in a step 714, it is determined whether the entire message input to the message splitter is valid. If it is not, then an error message is generated in step 715 and then control is transferred to step 716.

If the entire message input to the splitter is valid, then the self pointer is verified for the candidate messages produced by the message splitter. It should be noted that in general, whether or not the entire message is valid, those portions of the message which were successfully split are verified in a step 716. Step 716 verifies the self pointer for each candidate message and determines whether or not it is valid. Step 716 is described in further detail in FIG. 9. If it is invalid, then control is transferred to step 717 and an appropriate error message is generated. If the self pointer is valid, then control is transferred to step 718 and idempotence is tested. Step 718 is described in further detail in FIG. 10. If the message has already been received, then control is transferred to step 717 and an appropriate error message is generated. If the message has not already been received, then control is transferred to a step 720 and the message is passed to the transaction message validator. The process ends as 722.

It should be noted that in the process flow diagram illustrated in FIG. 7A, all of the candidate messages are shown undergoing processing steps together and errors are shown as being generated when the entire raw message or all of the split candidate messages do not meet certain criteria. In different embodiments, candidate messages are stripped from the raw message and processed sequentially, in parallel, or asynchronously. Generally, error messages that are generated for candidate messages that fail to meet a test criteria identify the candidate message for which the error was detected and identify the specific error that was detected, including where appropriate the point in the message where the error occurred.

Figure 7B:
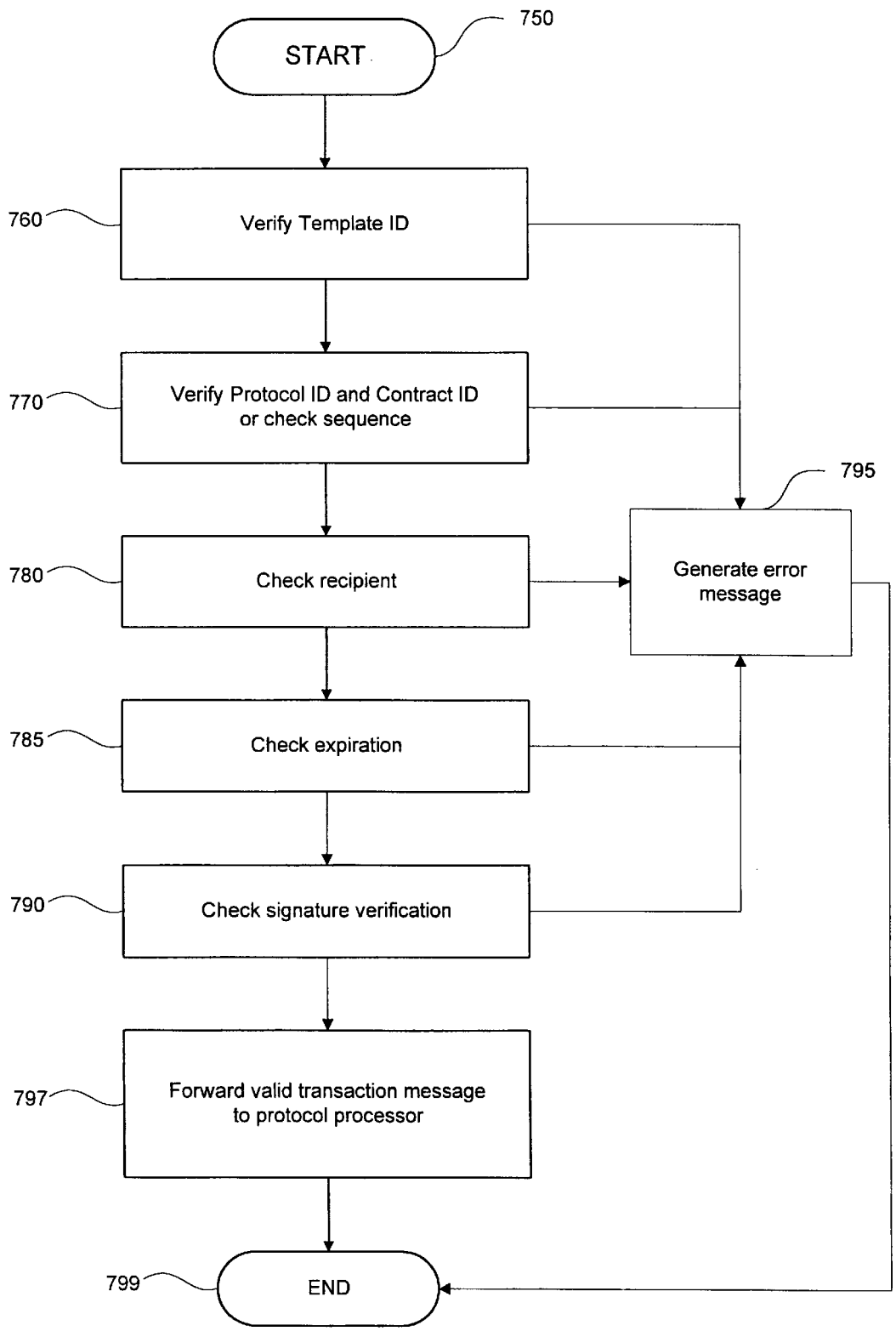
FIG. 7B is a process flow diagram illustrating a process running on the transaction message validaitor for validating transaction messages.

FIG. 7B is a process flow diagram illustrating a process running on transaction message validator 410 for validating transaction messages. The process starts at 750. In a step) 760, the template ID encapsulated in the transaction message is verified. Step 760 is described in further detail in FIG. 11. Next, in a step 770, the protocol ID and the contract ID encapsulated in the transaction message are verified for first messages in a message sequence and the previous and first message ID's are checked for subsequent messages to ensure that they are part of a proper message sequence. Step 770 is described in further detail in FIGS. 12 and 13. In a step 780, the recipient is checked. Step 780 is described in further detail in FIG. 15. In a step 785, message expiration is checked. Step 785 is described in further detail in FIG. 16. Step 785 is described in further detail in FIG. 16. and in a step 790 signature verification is checked. Step ,790 is described in further detail in FIG. 17. In each of the above mentioned steps, if the check or verification fails, then an appropriate error message is generated in a step 795. After an error message is generated, the process ends at 799. If all of the verification steps are positive, then the valid transaction message is forwarded to a protocol processor in a step 797 and the process ends at 799.

Figure 8:
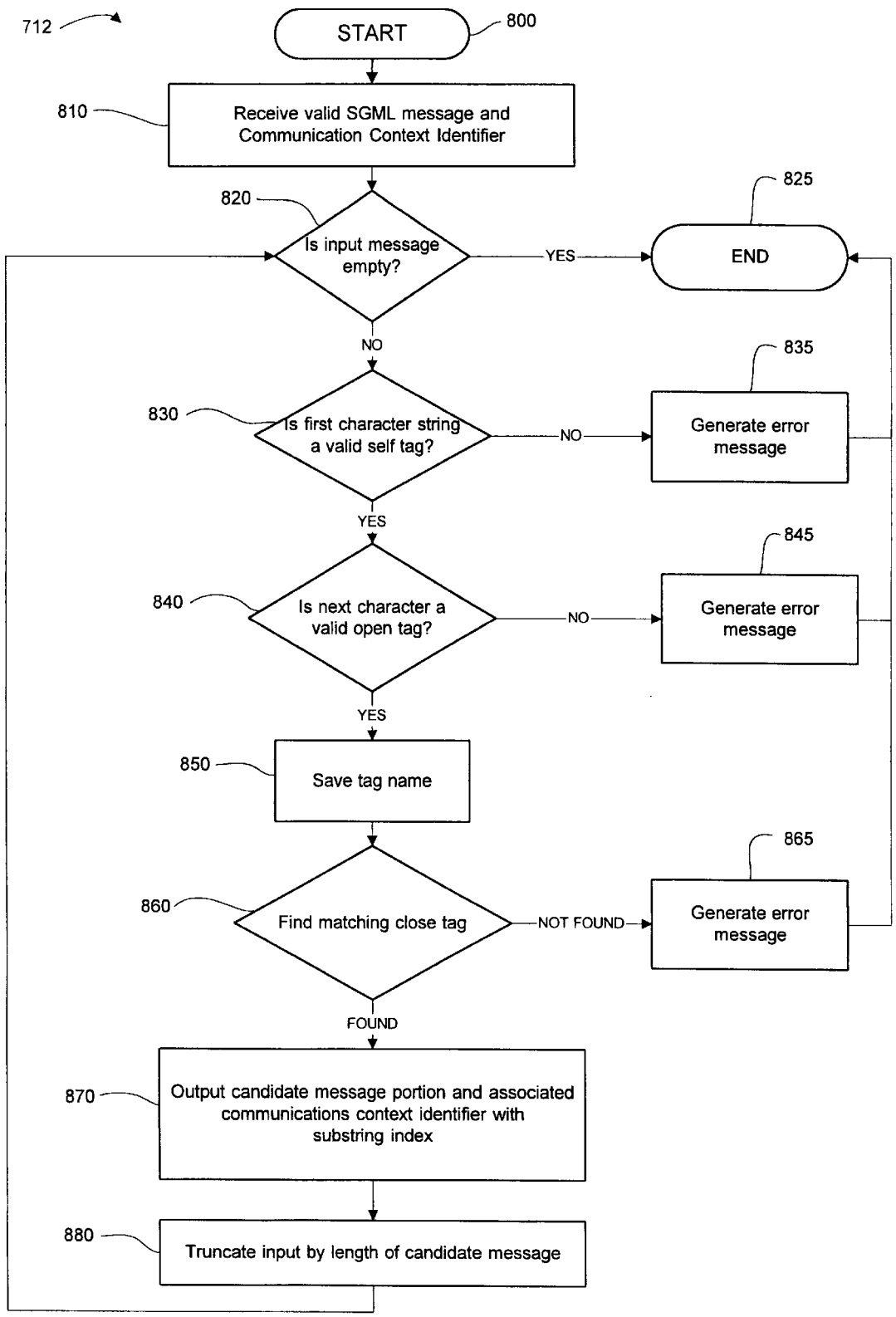
FIG. 8 is a process flow diagram illustrating a process running on the splitting block for splitting raw messages into candidate transaction messages.

FIG. 8 is a process flow diagram illustrating a process running on splitting block 452 for splitting raw messages into candidate transaction messages which is shown as step 712 of FIG. 7A. The process begins at 800. In a step 810, the message splitting block receives a valid SGML message or SGML message portion and a communication context identifier from the SGML verification block. In step 820, the message is checked to see if it is empty. If it is empty, then the process ends at 825. If it is not empty, then the first character string is checked to see if it is a well-formed self tag in a step 830. (In embodiments where SGML is used, for example, the first character string is checked to see if it is well-formed as a self tag in SGML. If it is not a well formed self tag, then control is transferred to a step 835 and an appropriate error message is generated and the process ends at 825. As noted above, whenever possible, error messages contain as much information about the error that occurred as is available. When possible, the error message generated in step 835 preferably contains the character position where the error occurred.

In the embodiment being described, the message is an SGML message. Various tools exist to parse SGML messages and check for SGML tags which are known by those skilled in the art. SGML parsing is described in Clark which was previously incorporated by reference. It should also be noted that other embodiments do not use SGML messages, but it will be apparent to one of ordinary skill that corresponding steps to the ones listed here for checking and splitting raw SGML messages into candidate transaction messages may be implemented.

If the first character string is a well-formed self tag, then control is transferred to a step 840 and the next character is examined to see if it is a valid open tag. If it is not a valid open tag, then control is transferred to a step 845 and an error message is generated and the process ends at 825. If the next character is a valid open tag, then control is transferred to a step 850 and the tag name is saved. Next, in a step 860, a search is made for a matching close tag. If a matching close tag is not found, then control is transferred to a step 865 where an error message is generated and the process ends at 825. If a matching close tag is found, then control is transferred to a step 870 where an output candidate message portion and associated communications context identifier along with a substring index is output. In a step 880, the input message is initially truncated (i.e. truncated from the beginning) by the length of the candidate message which was output in step 870. Control is then transferred back to step 820 and the process repeats itself until the entire content of the message has been truncated or an error has occurred.

Figure 9:
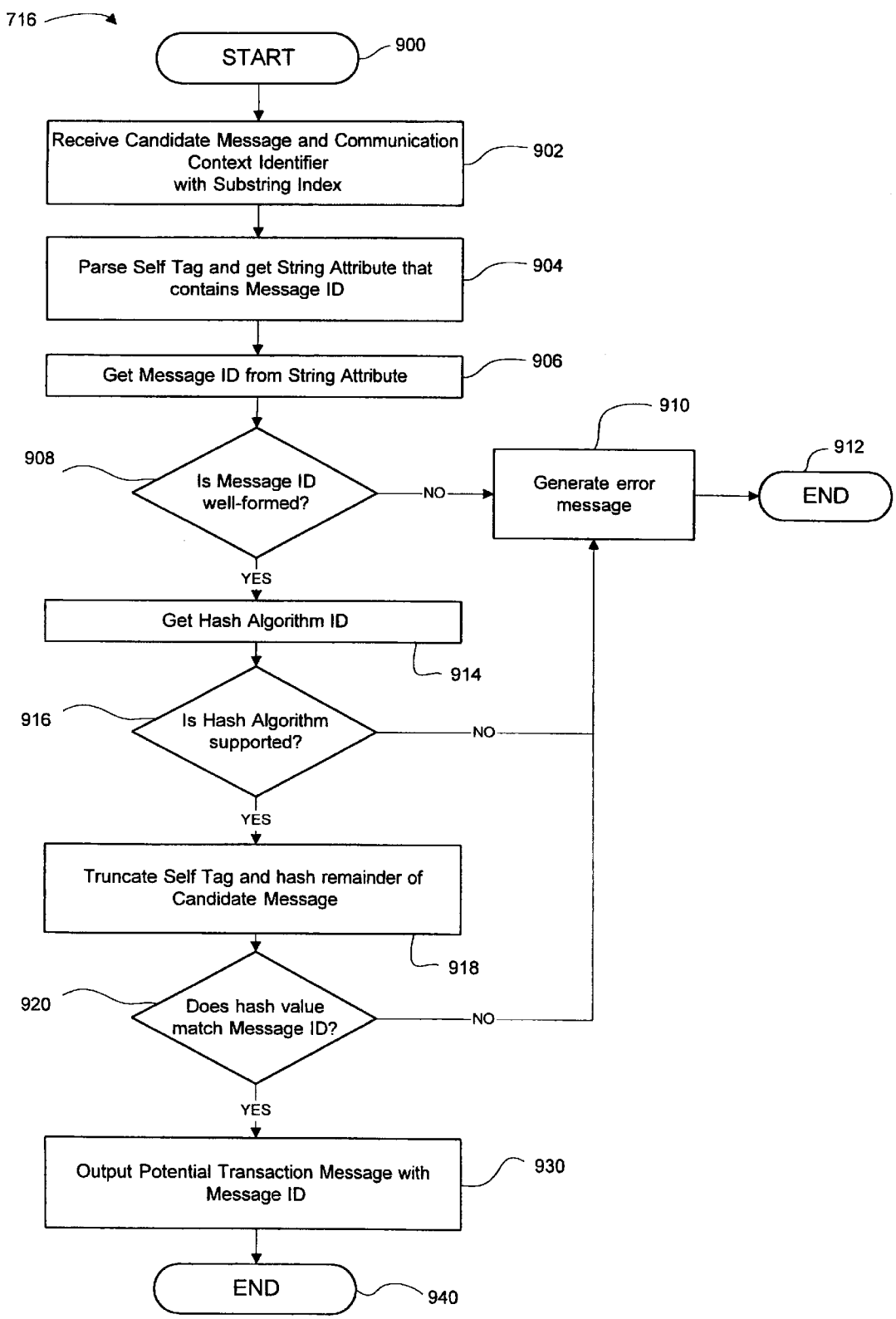
FIG. 9 is a process flow diagram illustrating in detail the process of verifying a self tag.

FIG. 9 is a process flow diagram illustrating in detail the process of verifying a self tag as described in step 716 of FIG. 7A which occurs in verify self tag block 454 of FIG. 4B. The process begins at 900. In a step 902, a candidate message is received along with a communication context identifier with a substring index. It should be noted that in general as the candidate transaction message is passed from block to block and different checks are performed on the candidate message, the results of the checks are logged in either the communication context database or the transaction context database. The purpose of passing the communication context identifier and substring index from block to block is to provide a way to identify the message within those databases. Other names indexes, or numbers could be used to identify messages in other embodiments. It is, however, preferred to use the communication context identifier, which as noted above is a CNS Identifier. In combination with a substring index, the communication context identifier verifiably identifies the portion of the raw message which is being checked.

In a step 904, the self tag is parsed and the string attribute that contains the message ID is retrieved. In a step 906, the processor gets the declared message ID from the string attribute. A step 908 checks whether the message ID is well formed. If it is not well formed, then control is transferred to a step 910 and an error message is generated. As will all error messages, it is preferred that the error message contained specific information about the error, i.e., that the message ID was not well formed. Once the error is generated, the process ends at 912. If the message ID is well formed, then control is transferred to a step 914 and the hash algorithm ID is retrieved from the string attribute.

In a step 916, the processor checks whether the hash algorithm is supported, that is, whether or not the hash algorithm is contained in a database assessable to the processor. If the hash algorithm is not supported then control is transferred to step 910 and an error message is generated to that effect and the process ends at 912. If the hash algorithm is supported, then control is transferred to a step 918 and the self tag is truncated and the remainder of the candidate message is hashed. In a step 920, it is checked whether the hash value matches the message ID. If it does not, then control is transferred to step 910, an error message is generated to that effect, and the process ends at 912. If the hash value does match the message ID, then control is transferred to a step 930 and the potential transaction message is output along with the message ID. The process ends at 940.

Figure 10:
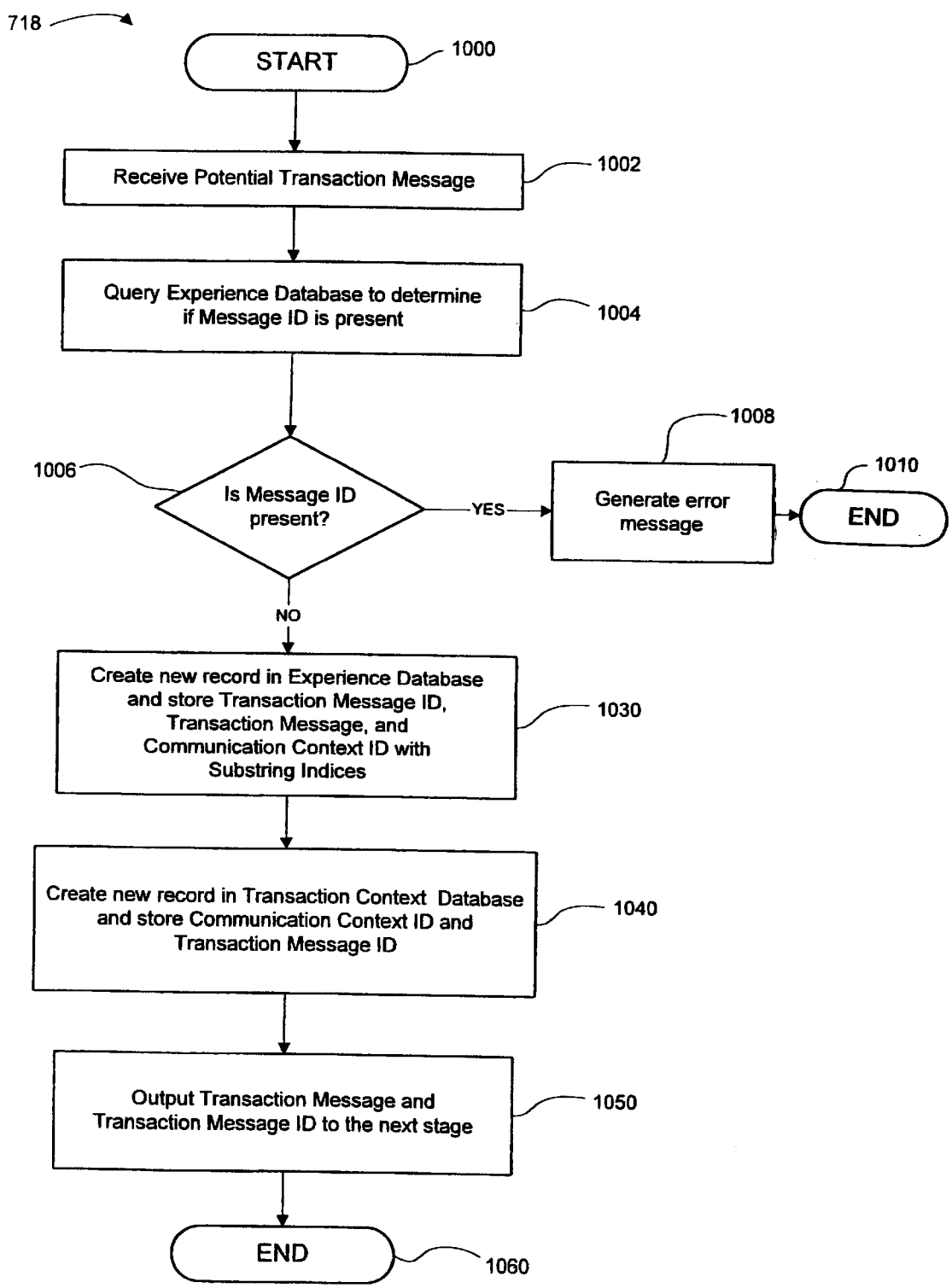
FIG. 10 is a process flow diagram illustrating in detail the process for checking idempotence.

FIG. 10 is a process flow diagram illustrating in detail the process for checking idempotence shown in step 718 of FIG. 7A and implemented in idempotence verification block 465. The process begins at 1000. A potential transaction message is received in a step 1002. The Experience database is queried in a step 1004 to determine if the message ID is present. If the message ID is present, then the message has been received already and the current message being tested is a duplicate. If the message ID is present, then a step 1006 transfers control to a step 1008 and an error message is sent indicating that a duplicate message has been received. The process then ends at step 1010.

This checking is referred to as verifying idempotence because the process of rejecting duplicate messages ensures that when a transaction message is received multiple times, it has the same effect as when a transaction message is received only once. A mathematical operator which has the property of returning the same result regardless of how many times it operates is referred to as idempotent. Idempotence has specific utility to enable the system to operate with various different networks. If the message ID is not present in the Experience database, then step 1006 transfers control to a step 1030. In step 1030, a new record is created in the Experience database and the transaction message ID, transaction message, and communication ID along with substring indices are stored in the Experience database. Next, in a step 1040, a new record is created in the transaction context database and the communication context ID and transaction message ID are stored in the new record. Next, in a step 1050, the transaction message is output along with a transaction message ID to the next processing stage.

Once idempotence has been checked in the above process, the output is a transaction message that has a valid transaction message ID and is not a duplicate. Next, all of the information that is encapsulated within the transaction message is checked to be certain that the message can be handled in the manner specified by the sender. This operation is performed by transaction message validator 410 shown in FIG. 4A.

Figure 11:
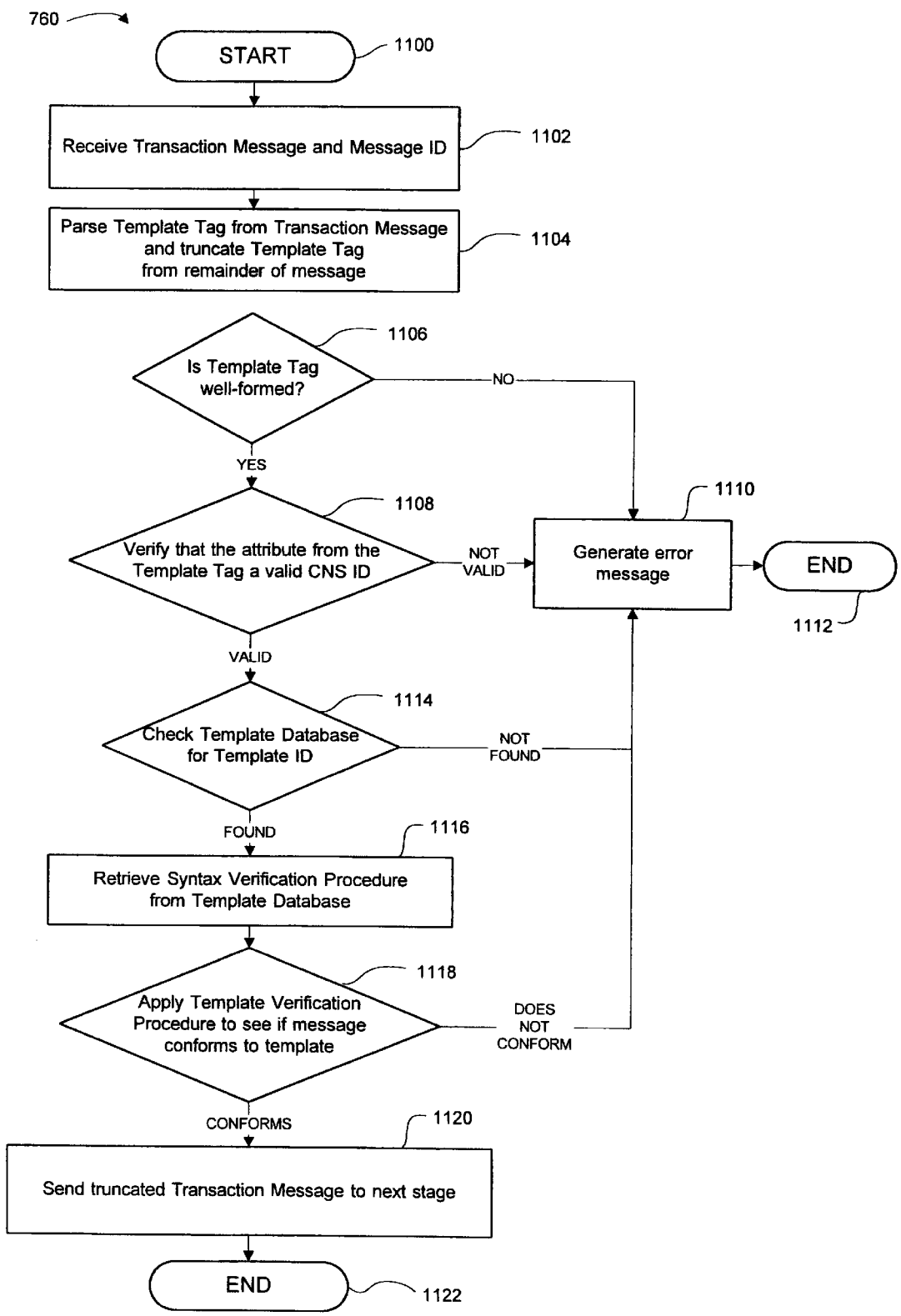
FIG. 11 is a process flow diagram illustrating in detail the process of verifying a template.

FIG. 11 is a process flow diagram illustrating in detail the process of verifying a template. The process shown corresponds to step 760 of FIG. 7B and is implemented in context verification block 460 of FIG. 4C which is a part of transaction message validator 410 of FIG. 4A. The process begins at 1100. In a step 1102, a transaction message and transaction message ID are received by the processor. In a step 1104, the processor parses the template tag from the transaction message. The template tag is then truncated from the beginning of the transaction message. It should be noted that in some embodiments the template tag is not truncated from the remainder of the message but each tag is parsed out individually. It is preferred in certain embodiments to truncate the message so that each tag that is checked in turn is located at the beginning of the message.

In a step 1106, the processor verifies that the template tag is well formed, that is, that it conforms to the expected format of a valid template tag. If the template tag is not well-formed, then control is transferred to a step 1110 where an error message is sent to that effect and the process ends at 1112. In a step 1108, the processor verifies that the attribute from the template tag is a valid CNS ID. If the attribute is not a valid CNS ID, then control is transferred to step 1110 where an error message is sent to that effect and the process ends at 1112.

If the attribute is a valid CNS ID, then control is transferred to a step 1114 and the template database is checked to see if the template ID is contained therein. It should be noted that since the template ID is a CNS ID, finding the template ID in the template database not only indicates that a template of the same name as is specified in the encapsulated transaction message exists, but also that the template in the template database exactly matches the template that is referred to by the template ID that was encapsulated in the message by the sender. If the template ID is not found, then control is transferred to step 1110 and an error message to that effect is generated and the process ends at 1112.

If a template ID is found, then control is transferred to a step 1116 and the syntax verification procedure corresponding to the template is retrieved from the template database. Next, in a step 118, the template verification procedure is applied to see if the message conforms to the template. If the message does not conform, then control is transferred to step 1110 and an error message is generated to that effect and the process ends at 1112. If the message does conform to the template, then control is transferred to a step 1120 and the truncated transaction message is sent to the next stage. The process ends at 1122.

It should be noted at this point that once the transaction message template is checked, information about the result of the check is stored in the transaction context database. Generally, each check that is performed on the transaction message is recorded in the transaction context database. Error messages that are sent are also recorded in the transaction context database, as well as the Experience database. Thus, the system monitors the progress of a transaction message through the various checking procedures so that the status of a given message may be determined by checking the databases.

Figure 12:
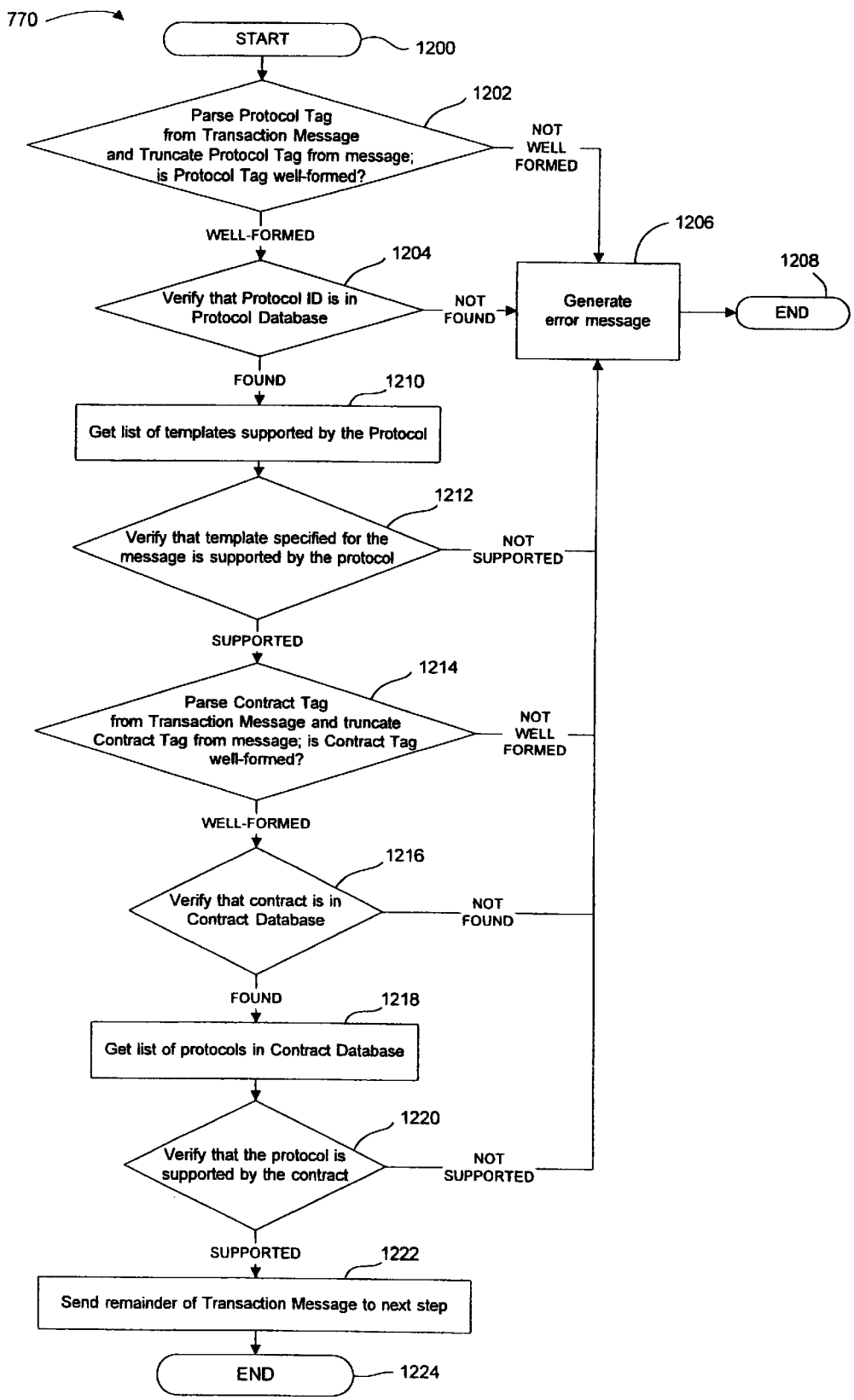
FIG. 12 is a process flow diagram illustrating in detail a process for checking the protocol and contract specified in a first transaction message of a transaction message sequence.

FIG. 12 is a process flow diagram illustrating in detail a process for checking the protocol and contract specified in a first transaction message of a transaction message sequence. The process corresponds to step 770 of FIG. 7 and is implemented in context verification block 460 of FIG. 4C for messages that are the first message of a message sequence. The process starts at 1200.

In a step 1202, the protocol tag is parsed from the transaction message and the protocol tag is truncated from the transaction message. Just as for the template tag, the protocol tag may not be well-formed or may not contain a well-formed CNS ID. In these cases, control is transferred to step 1206 and an error message to that effect is sent. Next, in a step 1204, the processor verifies that the protocol ID corresponds to a protocol that is in the protocol database. If the protocol is not found, then control is transferred to a step 1206 and an error message to that effect is sent. The process ends at 1208. If the protocol ID is found in the protocol database, then control is transferred to a step 1210 and the processor gets a list of templates that are supported by the protocol from the protocol database. Next, in a step 1212, the processor verifies that the template specified by the message is supported by the protocol.

It should be noted that the processor determines the template specified for the message by checking the transaction context database which preferably stores the template ID. If the template ID found in the transaction context database is not supported, then control is transferred to step 1206 and an error message to that effect is sent and the process ends at 1208. If the template specified for the message is supported by the protocol, then control is transferred to a step 1214 where the contract tag is parsed from the remaining portion of the transaction message and the transaction message is truncated to remove the contract tag. Just as for the template tag, the contract tag may not be well-formed or may not contain a well-formed CNS ID. In these cases, control is transferred to step 1206 and an error message to that effect is sent and the process ends at 1208. Next, in a step 1216, the processor verifies that the contract specified by the contract ID is in the contract database. If the contract ID is not found, then control is transferred to a step 1206 and an error message to that effect is sent and the process ends at 1208. If the contract ID is found in the contract database, then control is transferred to a step 1218 and the processor gets a list of protocols from the contract database that are permitted by the contract identified by the contract ID. Again, it should be noted that because the contract and protocol ID's are CNS ID's, finding those ID's in the contract and protocol databases indicates not only that a contract or protocol of that name exists, but that the exact contract or protocol specified by the CNS ID provided by the sender exists.

If the protocol is not permitted by the contract, then step 1220 transfers control to step 1206 and an error message to that effect is sent and the process ends at 1208. If the protocol is permitted by the contract, then control is transferred to a step 1222 and the remainder of the transaction message is sent to the next step. The process ends at 1224.

Once the process shown in FIG. 12 is completed for a first transaction message of a transaction message sequence, it has been verified that the template, protocol, and contract of that message correspond to a template, protocol, and contract that is contained in a database that is accessible to the message receiver. For a message that is not the first transaction message of a transaction message sequence, it is not necessary to check whether the contract and protocol are found in databases accessible to the receiver. Generally, contract and protocol ID's are not encapsulated along with a transaction message which is not the first message of a sequence. Instead, a first message ID and a previous message D:) are specified. The first message ID corresponds to the first message of the transaction message sequence and the previous message ID corresponds to the message in the transaction message sequence that immediately preceded the current message.

Figure 13:
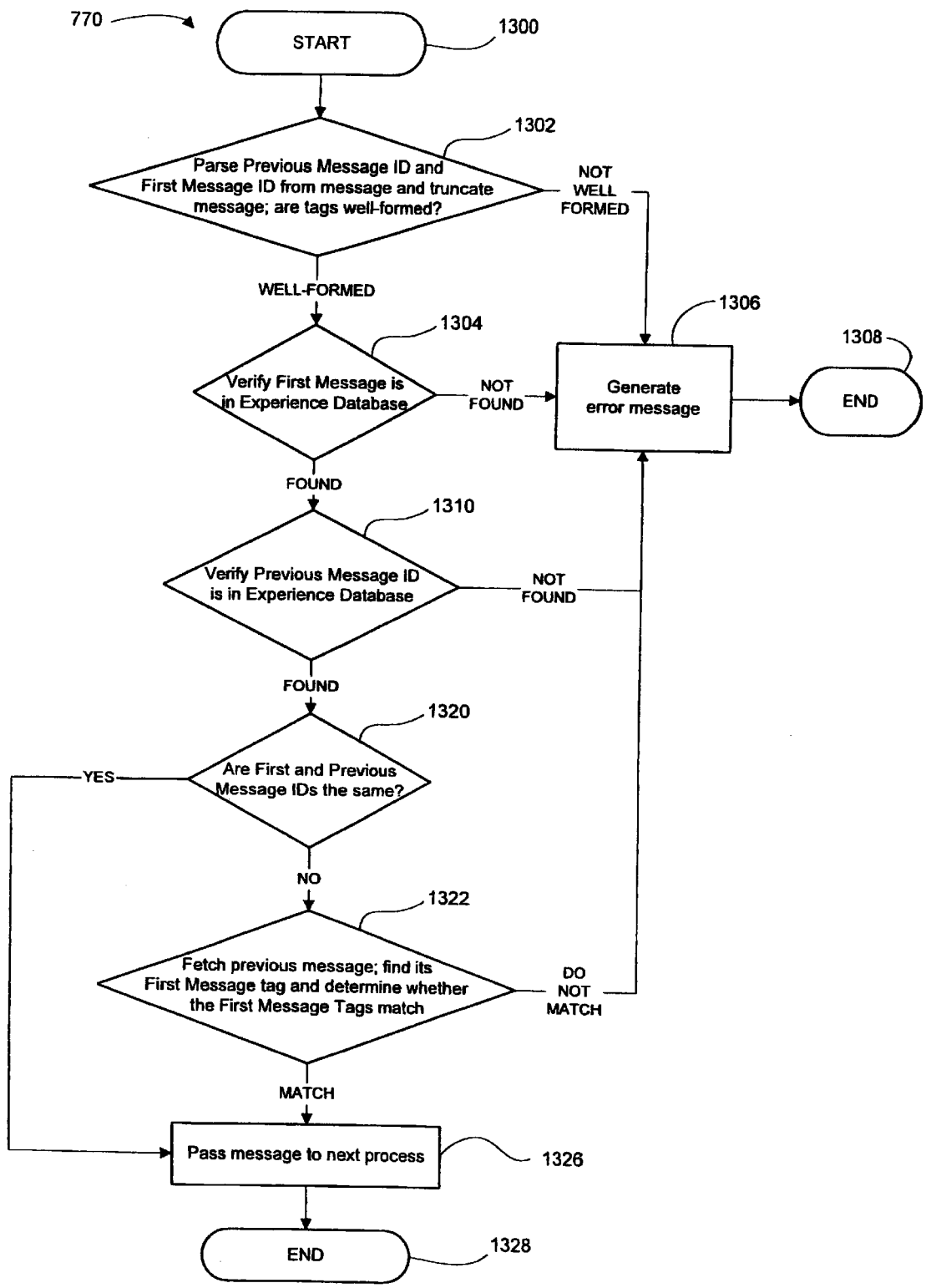
FIG. 13 is a process flow diagram illustrating a process for verifying that the first and previous message ID's correspond to a first message and a previous message that is stored in the transaction context database, thus checking the sequence of the transaction message.

FIG. 13 is a process flow diagram illustrating a process for verifying that the first and previous message ID's correspond to a first message and a : previous message that is stored in the transaction context database, thus checking the sequence of the transaction message. It should be noted that transaction message ID's are preferably stored in the transaction context database so that information is available to the processor. In certain embodiments, the first message ID and previous message ID may also be stored in the Experience database and the processor may access the Experience database for this information. The process shown corresponds to step 770 of FIG. 7B and is implemented in context verification block 460 of FIG. 4C.

The process starts at 1300. In a step 1302, the processor parses the previous message ID and the first message ID from the remaining portion of the transaction message and truncates the previous message ID and first message ID from the transaction message. Just as for the template tag, the contract tag may not be well-formed or may not contain a well-formed CNS ID. In these cases, control is transferred to a step 1306 and an error message to that effect is sent and the process ends at 1308. Next, in a step 1304, the processor verifies whether the first message ID is in the Experience database, that is, whether a first message corresponding to the first message ID has been received. If the first message ID is not found, then control is transferred to step 1306 and an error message is sent and the process ends at step 1308. If the first message ID is found in the Experience database, then control is transferred to a step 1310. In step 1310, the processor verifies whether a message ID exists in the Experience database corresponding to the previous message ID. If a message is not found, then control is transferred to step 1306 and an error message is sent to that effect and the process ends at 1308.

If the previous message is found, then control is transferred to a step 1320 and the processor checks whether the specified previous message ID and first message ID are the same. If they are not the same, then it is necessary to check whether the first message ID specified by the previous message corresponds to the first message ID specified by the current message. That is, it is necessary to check whether the current message references a previous message that is not in the correct transaction message chain beginning with the same first message. In a step 1322, the processor fetches the previous message from the Experience database and determines whether the first message tag of the previous message matches the first message tag of the current transaction message. If the first message tags do not match, then control is transferred to a step 1306 and an error message to that effect is sent and the process ends at 1308. If the first messages do match, then control is transferred to a step 1326. If the first message and previous message ID's are the same, then control is transferred directly from step 1320 to step 1326 since it is not necessary in that case to check whether the first message ID's match. In step 1326, processor passes the message to the next process and the process ends at 1328. It should again be noted that as each check is made including the above-mentioned first message and previous message check, the results are updated in the transaction context database.

Once the first and previous messages are checked or the contract and protocol are checked, and the template is checked, the context of the transaction message has been verified. Once the expiration of the message is checked, the validity of the recipient is checked, and the authentication of the sender is checked, the transaction message will be established as a valid transaction message ready to be acted upon in accordance with the protocol. As each check on the message is made, the results are noted in the transaction context database and when a message fails a check, an error message is sent back to the sender. In certain embodiments, error messages may be omitted in some cases. It may be useful at this time to describe the operation of an error processing module which manages error messages and ensures that they are stored as necessary.

Figure 14:
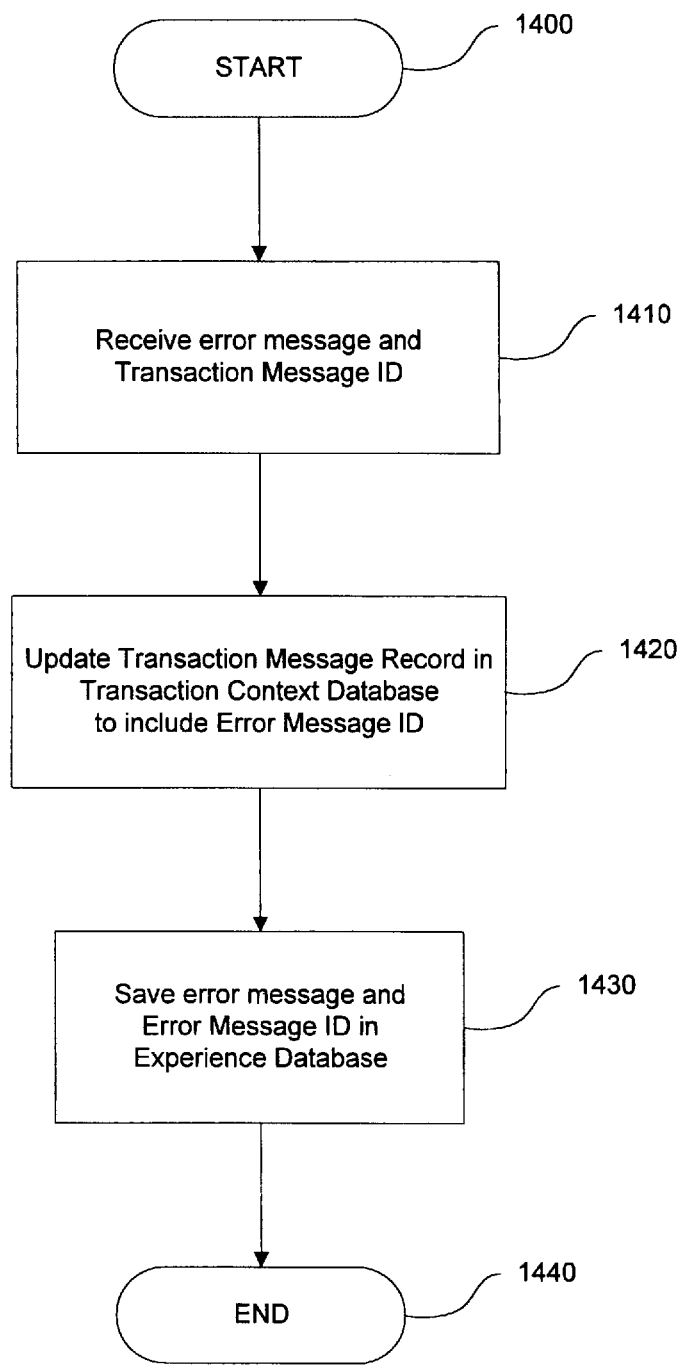
FIG. 14 is a process flow diagram illustrating how error messages are generated and handled.

FIG. 14 is a process flow diagram illustrating how error messages are generated and handled. The process starts at 1400. In a step 1410, an error message is received along with the transaction message ID of the transaction message which caused the error message to be generated. Next, in a step 1420, the processor updates the transaction message record in the transaction context database corresponding to the transaction message ID so that the record includes the error message ID in its list of generated response message ID's. Next, in a step 1430, the error message is saved in the Experience database along with the error message ID. The process ends at 1440.

Thus, each error message is listed in the transaction context database in the record for the transaction message that caused it to be generated. Each error message is also saved in the Experience database along with the error message ID. In some embodiments, a standard set of error messages are used so that it is not necessary to save the error message itself in the Experience database. Instead, the error message ID only is saved and the error message can be looked up given the error message ID. The error message ID in the Experience database enables messages that are sent by the transaction message sender in response to error messages sent by the transaction message receiver to be verified in a given transaction message sequence.

Transaction messages sent in response to an error message may reference the error message is the previous message. The error message can be found in the list of response messages in a record of the transaction context database and from the information in the transaction context database, the transaction sequence belonging to the error message can be identified.

Figure 15:
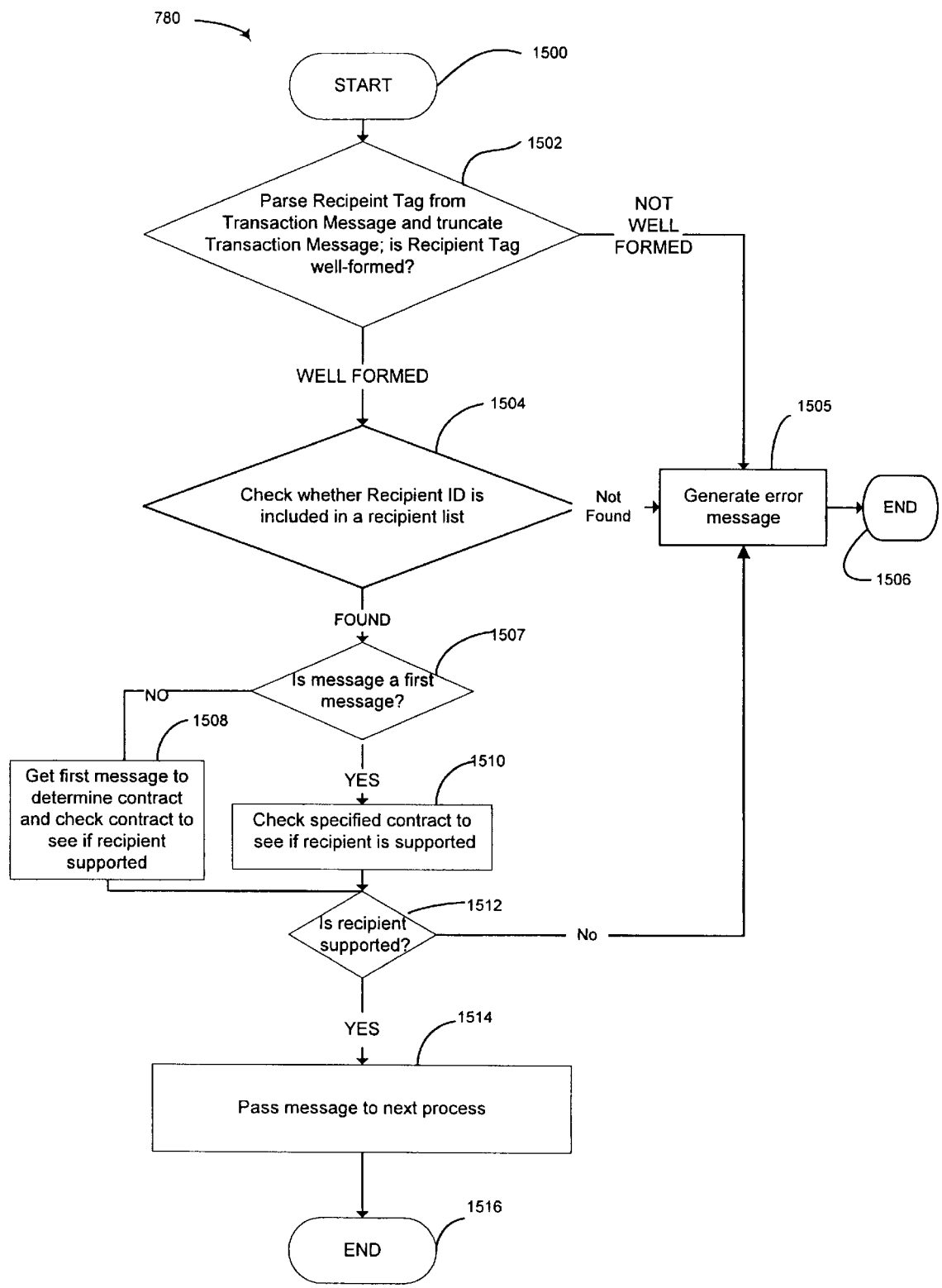
FIG. 15 is a process flow diagram illustrating a process for verifying that the recipient ID specified in a recipient tag corresponds to a recipient for which the message receiver is authorized to receive messages.

FIG. 15 is a process flow diagram illustrating a process for verifying that the recipient ID specified in a recipient tag corresponds to a recipient for which the message receiver is authorized to receive messages. The process corresponds to step 780 of FIG. 7B and is implemented in context verification block 460 of FIG. 4C. The process starts at 1500. In a step 1502, the processor parses the recipient tag from the transaction message and truncates the transaction message, removing the recipient tag. As with other tags, the recipient tag may not be well-formed or may not contain a well-formed CNS ID. In these cases, control is transferred to a step 1505 and an error message to that effect is sent and the process ends at 1506. It should be noted that the recipient of a message is distinguished from the message receiver. The message receiver is the actual party that physically receives the message and the message recipient is the party who is obligated to act on the message and has somehow delegated to the message receiver the task of receiving and checking the message before forwarding it to the recipient. In some embodiments, the receiver may be delegated the task of processing the message as well.

In a step 1504, the processor checks whether the recipient ID is included in a recipient list. If the recipient ID is not found, then control is transferred to step 1505 and an error message to that effect is generated and the process ends at 1506. If the recipient ID is found in the recipient list, then control is transferred to a step 1507 where the processor checks whether the message is a first message. If the message is a first message, then control is transferred to a step 1510 and the processor checks the contract specified in the first message to see if the recipient is relevant under the contract. If the message is not a first message, then control is transferred to step 1508 and the processor gets the first message to determine the contract and then checks the contract to see if the recipient is relevant. Once step 1508 or step 1510 is accomplished, control is transferred to a step 1512. If the recipient is not relevant under the contract, then step 1512 transfers control to step 1505 where an error message to that effect is generated and the process ends at 1506. If the recipient is relevant under the contract, then control is transferred to a step 1514 and the processor passes the message to the next process. The process ends at 1516.

Figure 16:
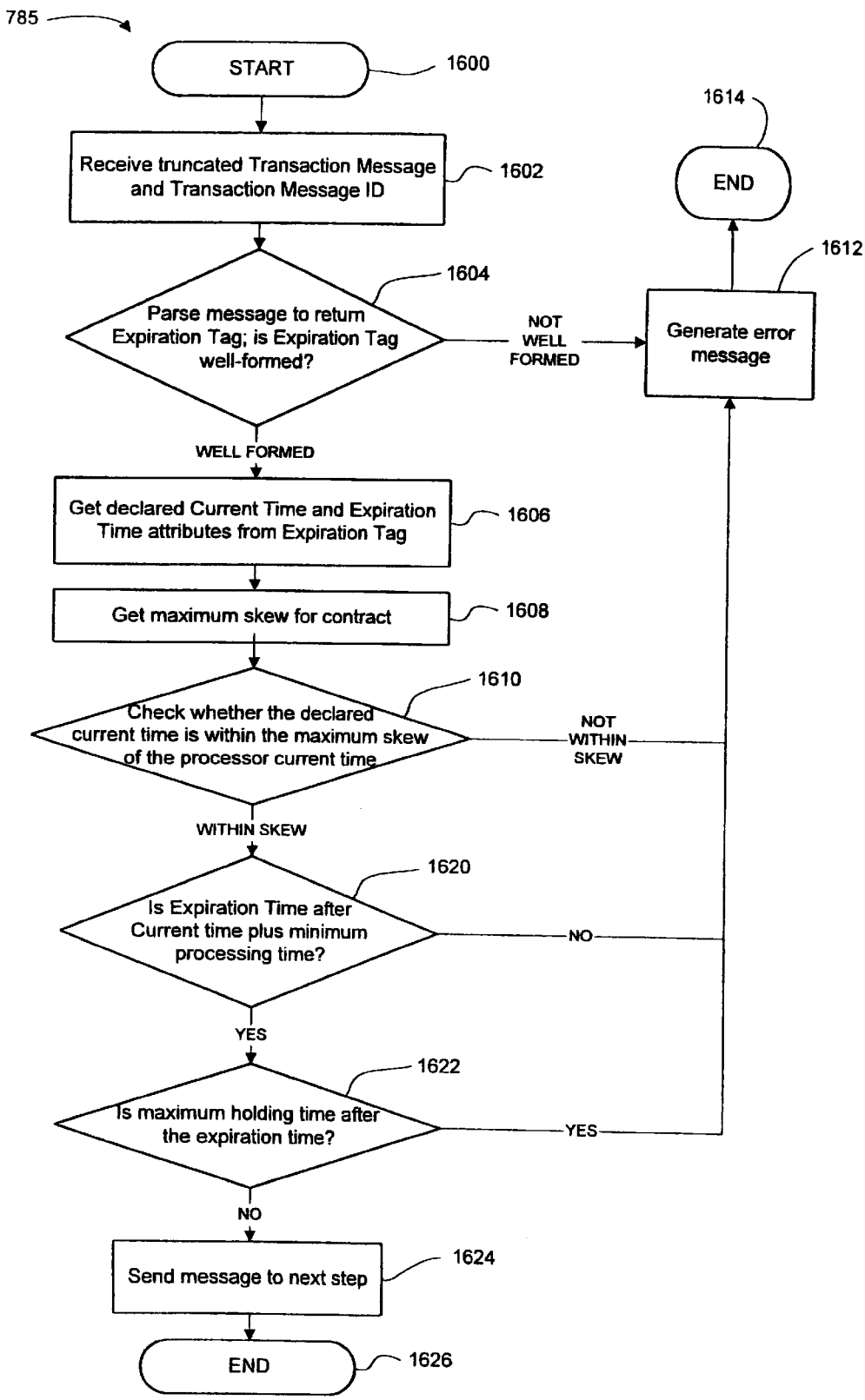
FIG. 16 is a process flow diagram illustrating a process for checking whether the declared current time and expiration time of a transaction message whose context has been verified are acceptable under the contract governing the message.

FIG. 16 is a process flow diagram illustrating a process for checking whether the declared current time and expiration time of a transaction message whose context has been verified are acceptable under the contract governing the message. The process corresponds to step 785 of FIG. 7B and is implemented in message expiration check in block 462 of FIG. 4C. The process starts at 1600. In a step 1602, the processor receives a truncated transaction message and transaction message ID. Next, in a step 1604, the processor parses the message to return the expiration tag. If the expiration tag is not well-formed, then an error message is generated in a step 1612 and the process ends at 1614. If the expiration tag is well-formed, then, in a step 1606, the processor gets the declared current time and expiration time attributes from the expiration tag.

In a step 1608, the processor gets the maximum skew time allowed under the contract. The maximum skew time is the amount that the declared current time in the message is allowed to vary from the current time measured by a clock accessed by the processor. In a step 1610, the process checks whether the declared current time is within the maximum skew of the processor current time. If the declared current time is not within the skew, then control is transferred to step 1612 where an error message is generated to that effect and the process ends at 1614. If the time is within the skew, then control is transferred to a step 1620.

In step 1620, the processor checks whether the expiration time specified in the transaction message is alter the current time plus a minimum holding time or minimum processing time. If the expiration time is not after the current time plus minimum processing time, then control is transferred to 1612 where an error message is generated to that effect and the process ends at 1614. If the expiration time is after the current time plus a minimum processing time, then control is transferred to a step 1622. In step 1622, the processor checks whether the maximum holding time is after the expiration time. If it is not, then control is transferred to step 1612 where an error message is generated to that effect and the process ends it 1614. If the maximum holding time is not after the expiration time, then control is transferred to a step 1624 and the message is sent to the next step. The process ends at 1626.

Thus, the message declared current time is checked against the current time of the processor clock to make certain that the processor clock and the clock at the message sender are not too far skewed. Skew could result from the clock's reading different times or from excessive data channel communication delays. Next, it is checked whether there is sufficient time to process the message and it is also checked that the message will expire within a certain minimum time period in order to avoid filling up the databases with messages that never expire or expire only after a very long period of time.

Figure 17:
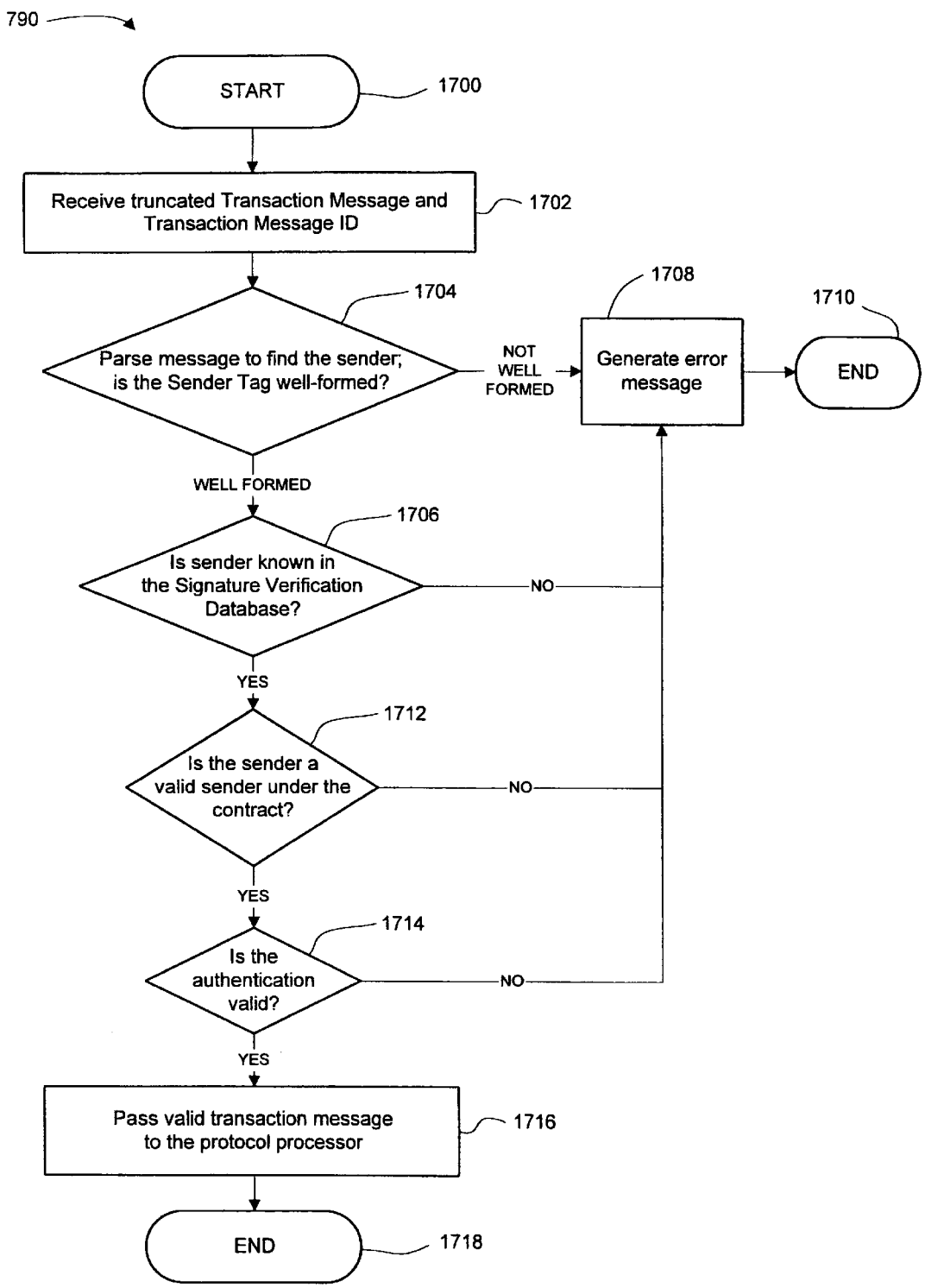
FIG. 17 is process flow diagram illustrating a process for verifying the sender of a message.

FIG. 17 is process flow diagram illustrating a process for verifying the sender of a message. The process corresponds to step 790 of FIG. 7B and is implemented in signature verification block 464 of FIG. 4C. The process starts at 1700. In a step 1702, the processor receives a truncated transaction message and transaction message ID. In a step 1704, the processor parses the message to find the sender tag which may include both a sender ID and sender authentication. If the sender tag is not well-formed, then an error message is generated in a step 1708 and the process ends at 1710. If the sender tag is well formed, then control is transferred to a step 1706. In step 1706, the processor checks whether the sender is known in the signature verification database. If the sender is not known, then control is transferred to a step 1708 and an error message to that effect is generated and the process ends at 1710. If the sender is known in the signature verification database, then control is transferred to a step 1712 where the processor checks whether the sender is a valid sender under the contract governing the transaction message. If the sender is not a valid sender, then control is transferred to step 1708 and an error message is generated to that effect and the process ends at step 1710.

If the sender is a valid sender, then control is transferred to a step 1714 where the processor checks whether the authentication is valid. A typical authentication might be a digital signature using the sender's private key. It should be noted that in some embodiments, authentication is not checked because senders with access to the data channel are assumed to be authentic. If the authentication provided by the sender is not valid, then control is transferred to step 1708 and an error message is generated to that effect and the process ends at 1710. If the authentication is valid, then control is transferred to a step 1716 and the valid transaction message is passed to the protocol processor. The process ends at 1718.

Thus, a system has been shown which is configured to receive encapsulated transaction messages and to perform checks on the message to determine that the message was sent in the right context and that its expiration time is acceptable and that the sender is authentic and authorized to send the transaction message. The valid transaction message can then be processed according to an appropriate protocol.

Although the foregoing invention has been described in some detail for purposes of clarity of understanding, it should be noted that there are may alternative ways of implementing both the process and apparatus of the present invention. For example, the system has been described as processing and verifying messages between two parties. The system is also well adapted to processing and verifying messages internally for a single party. The encapsulated message data structure may also be implemented on a single party for security purposes. Also, although transaction messages are specifically described, other messages could be sent and processed using the encapsulated message data structure described. Accordingly, the present embodiments are to be considered as illustrative and not restrictive, and the invention is not to be limited to the details given herein, but may be modified.

What is claimed is:

1. A method of processing a transaction message comprising:

receiving an incoming raw transport message;

storing the raw transport message in a channel interface database;

generating a raw message identifier from the raw transport message, the raw message identifier being determined such that the raw message identifier verifiably identifies the raw message;

generating a communications context identifier, the communications context identifier being determined such that the communications context identifier verifiably identifies the raw message and a channel from which the raw transport message was received;

converting the raw message into a transaction message; and validating the transaction message.

2. A method as recited in claim 1 further including storing a channel identifier in the channel interlace database.

3. A method as recited in claim 1 further including storing a timestamp in the channel interface database.

4. A method as recited in claim 1 wherein converting the raw message into a transaction message includes verifying the SGML form of the message.

5. A method as recited in claim 1 wherein converting the raw message into a transaction message includes splitting the raw message.

6. A method as recited in claim 1 wherein converting the raw message into a transaction message includes determining whether the message has already been received.

7. A method as recited in claim 1 wherein validating the transaction message includes verifying a template identifier.

8. A method as recited in claim 1 wherein validating the transaction message includes verifying a protocol identifier.

9. A method as recited in claim 1 wherein validating the transaction message includes verifying a contract identifier.

10. A method as recited in claim 1 wherein validating the transaction message includes checking whether an expiration time has been exceeded.

11. A method as recited in claim 1 wherein validating the transaction message includes checking the message recipient.

12. A method as recited in claim 1 wherein validating the transaction message includes verifying a digital signature.

13. A transaction message processor including:

a channel interface that is operative to receive an incoming raw transport message, generate a raw message identifier from the raw transport message, the raw message identifier being determined such that the raw message identifier verifiably identifies the raw message, and generate a communications context identifier that is determined such that the communications context identifier verifiably identifies the raw message and the channel;

a channel interface database for storing the raw transport message;

a raw message converter that is operative to convert the raw message into a transaction message; and a transaction message validator that is operative to validate the transaction message.

14. A transaction message processor as recited in claim 13 wherein the channel interface database stores a channel identifier.

15. A transaction message processor as recited in claim 13 wherein the channel interface database stores a timestamp.

16. A transaction message processor as recited in claim 13 wherein the transaction message validator is operative to verify a template identifier.

17. A transaction message processor as recited in claim 13 wherein the transaction message validator is operative to verify a protocol identifier.

18. A transaction message processor as recited in claim 13 wherein the transaction message validator is operative to verify a contract identifier.

19. A transaction message processor as recited in claim 13 wherein the transaction message validator is operative to verify a digital signature.

* * * * *